United States Patent
Lee et al.

(10) Patent No.: US 10,491,884 B2
(45) Date of Patent: Nov. 26, 2019

(54) IMAGE PROCESSING METHOD AND ELECTRONIC DEVICE SUPPORTING THE SAME

(71) Applicant: Samsung Electronics Co., Ltd., Gyeonggi-do (KR)

(72) Inventors: Sihyoung Lee, Gyeonggi-do (KR); Jihwan Choe, Gyeonggi-do (KR); Ki Huk Lee, Gyeonggi-do (KR); Sung Dae Cho, Gyeonggi-do (KR)

(73) Assignee: Samsung Electronics Co., Ltd, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/054,607

(22) Filed: Feb. 26, 2016

(65) Prior Publication Data
US 2016/0255329 A1 Sep. 1, 2016

(30) Foreign Application Priority Data
Feb. 27, 2015 (KR) .......................... 10-2015-0028646

(51) Int. Cl.
*H04N 13/20* (2018.01)
*H04N 13/261* (2018.01)
(Continued)

(52) U.S. Cl.
CPC ......... *H04N 13/261* (2018.05); *H04N 13/117* (2018.05); *H04N 13/207* (2018.05);
(Continued)

(58) Field of Classification Search
CPC .. H04N 13/261; H04N 19/137; H04N 13/207; H04N 13/211; H04N 13/117; H04N 2013/0081
See application file for complete search history.

(56) References Cited

U.S. PATENT DOCUMENTS 6,748,114 B1 * 6/2004 Ishikawa .............. H04N 19/114
    348/700
6,826,231 B2 * 11/2004 Takahashi .............. H04N 19/56
    375/240.16

(Continued)

FOREIGN PATENT DOCUMENTS

| CN | 102789648 A | 11/2012 |
|---|---|---|
| CN | 103200415 A | 7/2013 |

(Continued)

OTHER PUBLICATIONS

Pradeep, Vivek, et al. "MonoFusion: Real-time 3D reconstruction of small scenes with a single web camera." Mixed and Augmented Reality (ISMAR), 2013 IEEE International Symposium on. IEEE, 2013. 9 pages (Year: 2013).*

(Continued)

*Primary Examiner* — Manav Seth
(74) *Attorney, Agent, or Firm* — Cha & Reiter, LLC

(57) ABSTRACT

An image processing method is provided, including the operations of collecting a first motion picture, extracting spatial information about at least a part of frames forming the first motion picture, and reflecting the extracted spatial information to generation of a 3D view corresponding to the first motion picture.

18 Claims, 17 Drawing Sheets

(51) Int. Cl.
  *H04N 19/137* (2014.01)
  *H04N 13/211* (2018.01)
  *H04N 13/207* (2018.01)
  *H04N 13/117* (2018.01)
  *H04N 13/00* (2018.01)

(52) U.S. Cl.
  CPC ......... *H04N 13/211* (2018.05); *H04N 19/137* (2014.11); *H04N 2013/0081* (2013.01)

(56) References Cited

U.S. PATENT DOCUMENTS

| | | | |
|---|---|---|---|
| 7,224,732 B2* | 5/2007 | Takahashi | H04N 19/56 375/240.16 |
| 7,903,733 B2* | 3/2011 | Panda | H04N 19/172 375/240.03 |
| 8,659,592 B2 | 2/2014 | Wang et al. | |
| 8,837,026 B2 | 9/2014 | Fisker et al. | |
| 2003/0169946 A1* | 9/2003 | Bamford | G06K 9/00134 382/308 |
| 2008/0306709 A1 | 12/2008 | Fisker et al. | |
| 2011/0069152 A1 | 3/2011 | Wang et al. | |
| 2011/0164810 A1* | 7/2011 | Zang | G06T 17/00 382/154 |
| 2012/0176471 A1 | 7/2012 | Cheng et al. | |
| 2012/0293616 A1 | 11/2012 | Kwon | |
| 2013/0215230 A1* | 8/2013 | Miesnieks | H04N 13/20 348/46 |
| 2013/0329020 A1 | 12/2013 | Kriveshko et al. | |
| 2014/0115473 A1 | 4/2014 | Kwon | |
| 2015/0161818 A1* | 6/2015 | Komenczi | G06T 17/00 348/43 |
| 2016/0261847 A1 | 9/2016 | Kim | |

FOREIGN PATENT DOCUMENTS

| | | |
|---|---|---|
| CN | 103200417 A | 7/2013 |
| CN | 103533329 A | 1/2014 |
| EP | 2 525 581 A2 | 11/2012 |
| WO | 2012/115863 A2 | 8/2012 |

OTHER PUBLICATIONS

Pallav Garg et al., Relative Depth Estimation Using a Rotating Camera System, Proceedings of the International Conference on Image Processing, Computer Vision, and Pattern Recognition (IPCV), Jan. 1, 2013, pp. 1-6, XP055284902, Athens, http://worldcomp-proceedings.com/proc/p2013/IPC3886.pdf.
European Search Report dated Jul. 11, 2016.
Chinese Search Report, dated May 22, 2017.
Chinese Search Report dated Feb. 12, 2018.

* cited by examiner

IMAGE PROCESSING METHOD AND ELECTRONIC DEVICE SUPPORTING THE SAME

CLAIM OF PRIORITY

This application claims the benefit under 35 U.S.C. § 119(a) of a Korean patent application filed on Feb. 27, 2015 in the Korean Intellectual Property Office and assigned Serial number 10-2015-0028646, the entire disclosure of which is hereby incorporated by reference.

TECHNICAL FIELD

The present disclosure relates to an image processing method for generating 3D views using 2D picture data and an electronic device supporting the method.

BACKGROUND

Electronic devices, e.g., smart phones, tablet computers, and digital cameras, can provide various functions such as taking photos or motion pictures, media outputs, and so on. In taking photos or motion pictures, those electronic devices may diverse provide options therefor. Generating 3D views from original 2D pictures (original pictures) would take a considerably large amount of time. The original pictures would be photographed and stored in a memory of a user terminal. The 3D view would be generated from the stored 2D pictures. The original pictures would be transmitted to an external server and the external server would generate a 3D view from the original pictures which would be received from the user terminal. The external server can then transmit the generated 3D view to the user terminal and the user terminal outputs the received 3D view. The foregoing would make real-time error checking of the 3D view generating while photographing the 2D pictures unfeasible.

SUMMARY

Aspects of the present disclosure are to address at least the above-mentioned problems and/or disadvantages and to provide at least the advantages described below. Accordingly, an aspect of the present disclosure is to provide an image processing method for generating 3D views using 2D picture data and an electronic device supporting the method. In accordance with an aspect of the present disclosure, According to various embodiments of the present disclosure, it may be allowable for an electronic device to shorten a picture analyzing time by generating 3D information based on an original picture and an additional analyzing picture.

According to various embodiments of the present disclosure, it may be also allowable for an electronic device to improve the photographing accuracy of 3D view generation by a mode of photographing an original picture, based on spatial information extracted from the original picture and an additional analyzing picture.

DETAILED DESCRIPTION

Figure 1:
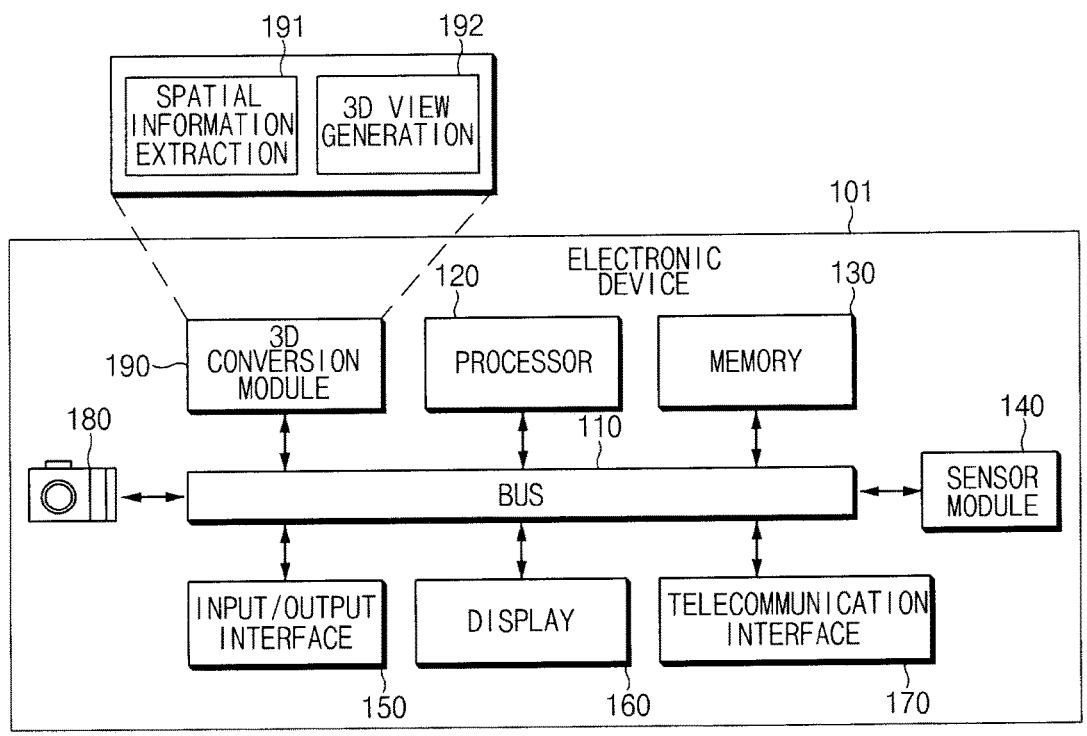
FIG. 1 is a block diagram illustrating an electronic device according to various embodiments.

Hereinafter, various embodiments of the present disclosure will be described in conjunction with the accompanying drawings. Various embodiments described herein, however, may not be intentionally confined in specific embodiments, but should be construed as including diverse modifications, equivalents, and/or alternatives. With respect to the descriptions of the drawings, like reference numerals refer to like elements.

The terms "have", "may have", "include", "may include", "comprise", or "may comprise" used herein indicate existence of corresponding features (e.g., numerical values, functions, operations, or components) but does not exclude other features.

As used herein, the terms "A or B", "at least one of A or/and B", or "one or more of A or/and B" may include all allowable combinations which are enumerated together. For example, the terms "A or B", "at least one of A and B", or "at least one of A or B" may indicate all cases of: (1) including at least one A, (2) including at least one B, or (3) including both at least one A, and at least one B.

As used herein, the terms such as "1st", "2nd", "first", "second", and the like may be used to qualify various elements regardless of their order and/or priority, simply differentiating one from another, but do not limit those elements thereto. For example, both a first user device and a second user device indicate different user devices. For example, a first element may be referred to as a second element and vice versa without departing from the scope of the present disclosure.

As used herein, if one element (e.g., a first element) is referred to as being "operatively or communicatively connected with/to" or "connected with/to" another element (e.g., a second element), it should be understood that the former may be directly coupled with the latter, or connected with the latter via an intervening element (e.g., a third element). Otherwise, it will be understood that if one element is referred to as being "directly coupled with/to" or "directly connected with/to" with another element, it may be understood that there is no intervening element (e.g., a third element) existing between them.

In the description or claims, the term "configured to" (or "set to") may be changeable with other implicative meanings such as "suitable for", "having the capacity to", "designed to", "adapted to", "made to", or "capable of", and may not simply indicate "specifically designed to". Alternatively, in some circumstances, a term "a device configured to" may indicate that the device "may do" something together with other devices or components. For instance, a term "a processor configured to (or set to) perform A, B, and C" may indicate a generic-purpose processor (e.g., CPU or application processor) capable of performing its relevant operations by executing one or more software or programs which is stored in an exclusive processor (e.g., embedded processor), which is prepared for the operations, or in a memory.

The terms used in this specification are just used to describe various embodiments of the present disclosure and may not be intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevantly related art and not in an idealized or overly formal detect unless expressly so defined herein in various embodiments of the present disclosure. In some cases, terms even defined in the specification may not be understood as excluding embodiments of the present disclosure.

Hereinafter, an electronic device according to various embodiments will be described in conjunction with the accompanying drawings. In description for various embodiments, the term "user" may refer to a person using an electronic device or a device (e.g., an artificial intelligent electronic device) using an electronic device.

FIG. 1 is a block diagram illustrating an electronic device according to various embodiments.

Referring to FIG. 1, an electronic device 101 may include a bus 110, a processor 120, a memory 130, a sensor module 140, an input/output interface 150, a display 160, a communication interface 170, a camera module 180, and a 3D conversion module 190. In some embodiments, the electronic device 101 might not include at least one of the foregoing elements or may further include another element therein.

The bus 110, for example, may include a circuit for connecting the processor 120, memory 130, sensor module 140, input/output interface 150, display 160, communication interface 170, camera module 180, and the 3D conversion module 190 to each other and relaying communication (control messages and/or data) therebetween.

The processor 120 may include at least one or more of a central processing unit (CPU), an application processor (AP), or a communication processor (CP). The processor 120, for example, may execute computation or data operation for control and/or communication of other elements of at least one of the electronic device 101. In various embodiments, the processor 120 may process information which is collected through the sensor module 140. The processor 120 may determine information about a moving direction, a moving distance, an acceleration of the electronic device 101, based on information collected through the sensor module 140. Information calculated through the processor 120 may be provided to the 3D conversion module 190.

The memory 130 may include a volatile and/or nonvolatile memory. The memory 130 may store, for example, instructions or data which are involved in at least one of other elements in the electronic device 101. According to an embodiment, the memory 130 may store software and/or a program The sensor module 140, for example, may measure a physical quantity or may detect an operation state of the electronic device 101, and may convert the measured or detected information into an electric signal. The sensor module 140, for example, may include a gesture sensor, a gyro sensor, an acceleration sensor, a grip sensor, a proximity sensor, a biometric sensor, an illuminance sensor, among other things.

According to various embodiments, the sensor module 140 may collect information about a moving direction, a moving speed, a location of the electronic device 101. The corrected information may be provided to the processor 120 or the 3D conversion module 190.

The input/output interface 150 may act, for example, as an interface capable of transferring instructions or data, which are input from a user or another external device, to another element (or other elements) of the electronic device 101. Additionally, the input/output interface 150 may output instructions or data, which are received from another element (or other elements) of the electronic device 101, to a user or another external device.

The display 160 may include, for example, a liquid crystal display (LCD), a light emitting diode (LED), an organic LED (OLED) display, a microelectromechanical system (MEMS) display, or an electronic paper. The display 160 may display, for example, diverse contents (e.g., text, picture, video, icon, or symbol) to a user. The display 160 may include a touch screen, and for example receive an input of touch, gesture, approach, or hovering which is made by using an electronic pen or a part of a user's body.

The communication interface 170 may set, for example, a communication condition between the electronic device 101 and an external electronic device (e.g., a first external electronic device 102, a second external electronic device 104, or a server 106). For example, the communication interface 170 may communicate with an external electronic device (e.g., the second external electronic device 104 or the server system 106) in connection with a network 162 through wireless communication or wired communication.

The camera module 180 may take a photograph or picture. In various embodiments, 2D images (for purposes of this document, the term "image" shall be a general term that includes, but is not limited to, a "frame", "frames" or a portion of a "frame") collected through the camera module 180 may be used for generating a 3D view. A user may use the camera module 180 to photograph an object which is to be converted into a 3D view. A user may use the camera module 180 to photograph an object while moving along a specific path (e.g., a circular path) around the object. From the photographed picture, spatial information, such as features and depths, may be extracted through the 3D conversion module 190 and then may be converted into a 3D view. In various embodiments, the spatial information may include at least a part of the following information: (1) relative coordinate information (X-Y-Z locations and yaw-pitch-roll directions); (2) depths respective to features (depth may be an interval between a camera and a part (e.g., a feature) of a shape of an object); and (3) relative conversion information between photographed pictures and estimated relative camera moving information by the relative conversion information.

The 3D conversion module 190 may process a picture, which is photographed through the camera module 180, and then may generate a 3D view. The 3D conversion module 190 may extract spatial information about features and depths and then may generate a 3D view for an object. In various embodiments, if the camera module 180 begins to photograph an object, the 3D conversion module 190 may generate an analyzing picture, which is scaled down or sampled, based on a photographed original picture. The 3D conversion module 190 may simultaneously execute a process of extracting information, which is necessary for generating a 3D view, from the analyzing picture, and a process of photographing the original picture.

According to various embodiments, the 3D conversion module 190 may include a spatial-information extraction part 191, and a 3D-view generation part 192. The spatial-information extraction part 191 may extract spatial information such as features and depths. Features may be determined based on contrast/color values of pictures. Depths may be relative intervals between features and the electronic device 101. The 3D-view generation part 192 may generate a 3D view to an object based on spatial information such as extracted features and depths.

Elements illustrated in FIG. 1 may be functionally classified and may not be restrictive hereto. For example, an operation processed in the 3D conversion module may be even performed through the processor 120. Additionally, the 3D conversion module 130 may be even included in a form of internal module of the processor 120.

Figure 2:
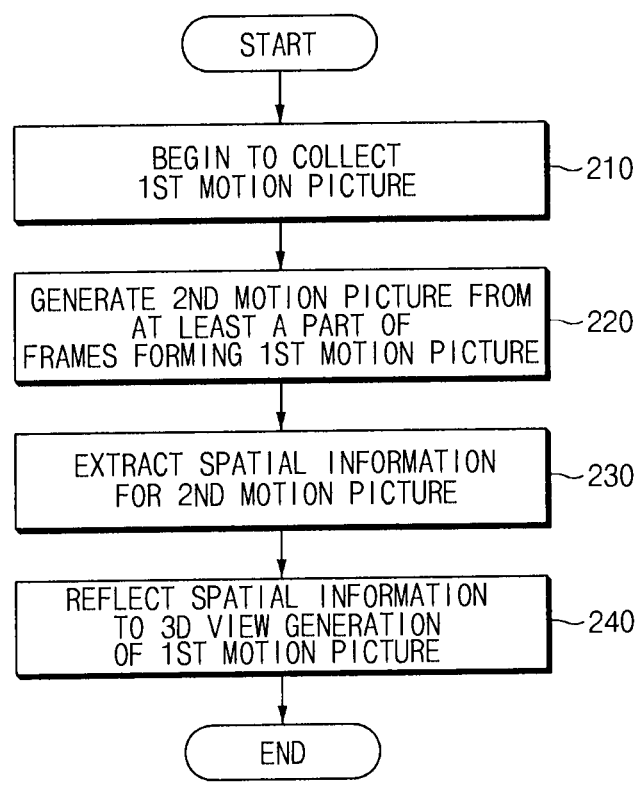
FIG. 2 is a flow chart showing a process of 3D view generation according to various embodiments.

FIG. 2 is a flow chart showing a process of 3D view generation according to various embodiments.

Referring to FIG. 2, at operation 210, a camera module 180 begins to photograph an object and to collect a first motion picture therefrom. For example, a user may execute a 3D camera application (hereinafter, curtly referred to as '3D app') to photograph an object. The 3D app may call the camera module 180 and may collect the first motion picture. After the beginning of the photographing, a user may photograph areas of an object, which are to be converted into a 3D view, while moving around the object in a circular form (e.g., while rotating 360° on the center of the object). The collected first picture may be stored in a buffer or the memory 130. The first motion picture may include a collection of still frames taken during regular periodic intervals (such as every 1/20 of one second) over a continuous period of time from continuous positions.

At operation 220, the 3D conversion module 190 may generate a second motion picture which is composed of at least a part of the frames forming the first motion picture (the second motion picture may not be frames which are continuously photographed, but may be data itself of a plurality of 2D images sampled from the first motion picture). The second motion picture may be an analyzing picture which is scaled down or sampled from the first motion picture under a specific condition. In various embodiments, the 3D conversion module 190 may execute a sampling process after reducing a data processing capacity by scaling the first motion picture down.

According to various embodiments, the second motion picture might not be collected after completing the photographing of the first motion picture, but may be collected through a background processing while the camera module 180 is continuously collecting the first motion picture. For example, if the photographing begins to take the first motion picture, the 3D conversion module 190 may scale down the first motion picture every specific time interval (e.g., 0.1 sec) and then may collect the second motion picture by sampling the scaled-down picture. Various sampling modes will be described later in conjunction with FIG. 5.

At operation 230, the 3D conversion module 190 may collect spatial information for the second motion picture, such as features, depths, and photographing locations. The 3D conversion module 190 may not directly extract spatial information of the first motion picture which is the original picture, but may extract spatial information from the second motion picture which is an analyzing picture sampled from the first motion picture. In this manner, the 3D conversion module 190 may extract information necessary for 3D conversion, using the scaled-down or sampled second picture, without waiting for an end of the photographing of the first motion picture (including a completion time of encoding a motion picture with the first motion picture which is being continuously photographed). Additionally, the 3D conversion module 190 may reduce an amount of calculated data, through the scaling-down or sampling, and may extract spatial information while the first motion picture is photographing.

At operation 240, the 3D conversion module 190 may reflect the spatial information of the second motion picture into a 3D-view generation process in correspondence with the first motion picture. For example, the 3D conversion module 190 may reflect spatial information of the second motion picture to an additionally continuing photographing for the first motion picture, or may utilize the spatial information to simplify a 3D-view generation process for the photographed first picture.

In various embodiments, the 3D conversion module 190 may generate a 3D view for the second motion picture and may provide the 3D view to a user. The user may additionally photograph the first motion picture while confirming the 3D view based on analyzing picture.

Figure 3A:
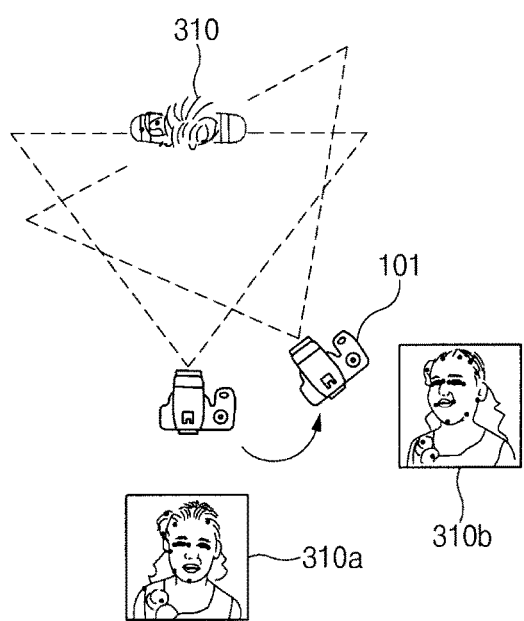
FIG. 3A and FIG. 3B are exemplarily diagrams illustrating a process of collecting first picture information according to various embodiments.
Figure 3B:
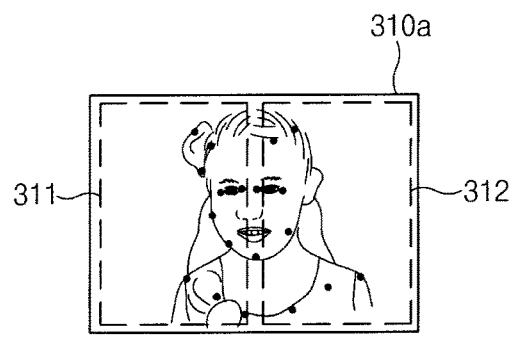

FIGS. 3A and 3B are exemplarily diagrams illustrating a process of collecting first picture information according to various embodiments.

Referring to FIG. 3A, an electronic device 101 may photograph a first motion picture through a camera module 180. A user may collect the first motion picture while gradually moving the electronic device 101 along a specific direction (e.g., from the left to the right) around an object 310. The first motion picture may be stored in a buffer or the memory 130. Although FIG. 3A is exemplarily illustrated as photographing the object 310 while a user is moving from the left to the right about the center of the object 310, various embodiments of the present disclosure may not be restrictive hereto. According to a mode to be set, the first motion picture may be even collected by photographing the object in a right-left direction or an up-down direction.

In the case that the electronic device 101 photographs the object 310 at a first location (e.g., the front direction of the object 310), a first image 310a may be collected. In the case that the electronic device 101 photographs the object 310 at a second location (e.g., a side direction of the object 310), a second image 310b may be collected. The images are taken by photographing the object 310 in different angles and may include different features each other thereon.

Additionally, the electronic device 101 may use the first image 310a and the second image 310b, which are photographed at different locations, to detect spatial locations respective to features. Additionally, the electronic device 101 may even detect a relative direction between a camera and an object, and positional information thereabout.

In various embodiments, the electronic device 101 may compare a plurality of images each other to analyze relations of features and to extract positional information (homography) between a camera and an object. Additionally, the electronic device 101 may use parallax information, which arises from a camera motion, even to extract depth information (depth from motion) of an abject.

According to various embodiments, in the case that spatial information cannot be confirmed only by pictures, the electronic device 101 may collect the spatial information through diverse sensors included in a sensor module 140. For example, in the case that features cannot be extracted, the electronic device 101 may use an acceleration sensor and a GPS sensor to extract information about moving directions, moving speeds, and locations from places at which frames are respectively photographed.

FIG. 3B illustrates a photographed picture at a first location according to various embodiments.

Referring to FIG. 3B, a picture 310a may include a multiplicity of features (point cloud). The front figure image, e.g., the picture 310a, may have relatively many features. Contrarily, the back figure image may have relatively small features.

In the case of photographing an object while moving the left to the right as illustrated in FIG. 3A, the left area of the picture 310a may be a loss field 311 and the right area may be a generation field 312. The loss field 311 may include a relatively large number of features at the beginning time of photographing. In the case that an electronic device 101 is moving from the left to the right after the beginning of photographing, the loss field 311 may decrease in the number of features for a specific part of the object. Differently, the generation field 312 may include a relatively small number of features for a specific part of the object, but may increase in the number of features to the specific part during the photographing.

The 3D conversion module 190 may extract spatial information of a second motion picture instead of extracting spatial information of features and depths for all frames of the first motion picture. In the case of processing all of spatial information for an original picture, an amount of data may be massive. Furthermore, it may take a long processing time and a user may spend a long time for confirming a 3D result. To overcome these problems, the 3D conversion module 190 may shorten a time for confirming a result of 3D conversion by first extracting spatial information for a sampled second picture and then by reflecting the spatial information to a photographing process of the first motion picture or a process of the 3D conversion.

Figure 4A:
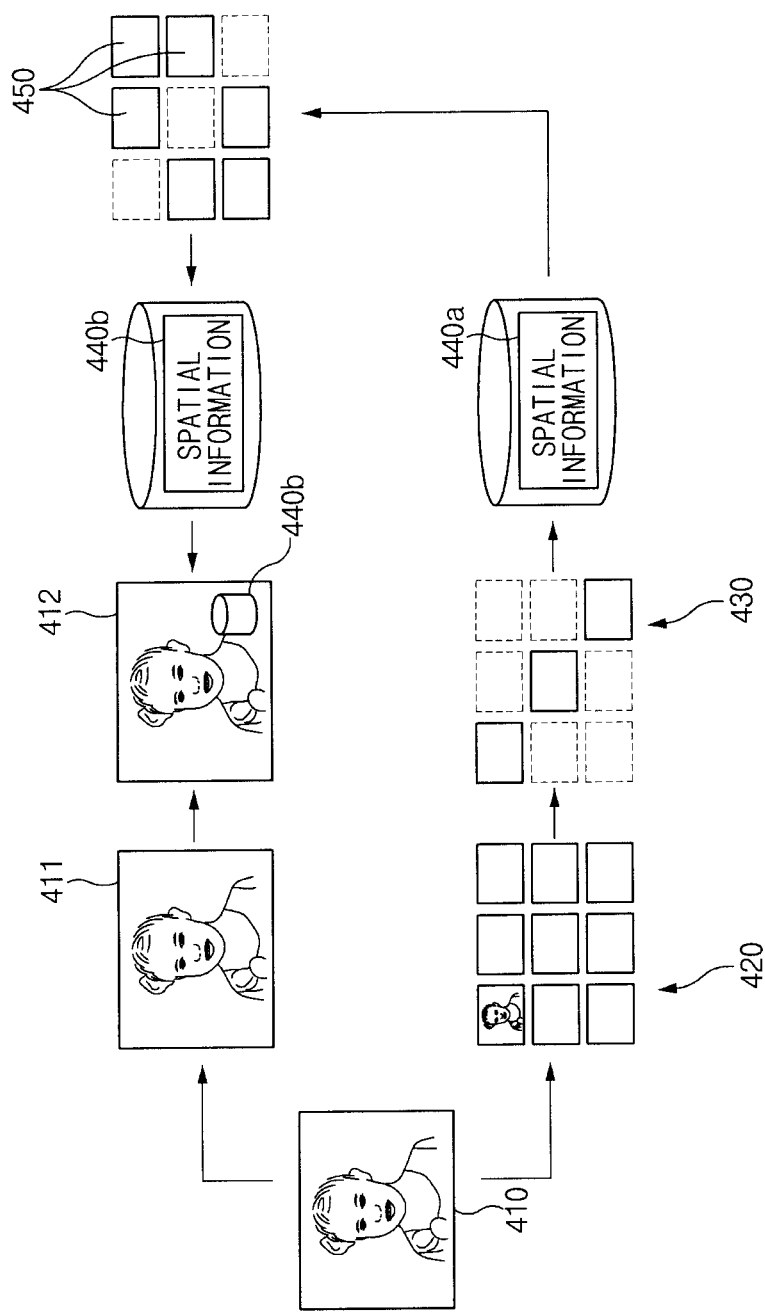
FIG. 4A is an exemplary diagram illustrating a process of collecting second picture information from first picture information according to various embodiments.

FIG. 4A is an exemplary diagram illustrating a process of collecting second picture information from first picture information according to various embodiments.

Referring to FIG. 4A, a camera module 180 may begin to collect a first motion picture 410. A 3D conversion module 190 may collect a second motion picture, which is scaled down or sampled from the first motion picture 410, in addition to continuously photographing and storing the first motion picture 410. Hereinbelow, the description will be focused on a sampling after scaling the first motion picture 410 down, whereas embodiments of the present disclosure may not be restrictive hereto.

The 3D conversion module 190 may scale the collected the first picture 410 to generate the second motion picture 420. After then, the 3D conversion module 190 may generate a sampled second picture 430 in accordance with a specific condition. For example, the sampled second picture 430 may be a subset of frames from the second motion picture that are collected at a lower sampling frequency, or higher sampling interval.

In addition to the photographing of the first motion picture 410, the 3D conversion module 190 may collect spatial information 440a, such as features and depths of frames forming the second motion picture 430, through a background work and then may store the collected spatial information in a buffer or memory.

According to various embodiments, the 3D conversion module 190 may extract spatial information 440b for the rest of the frames 450 of the second motion picture, which are not sampled, based on the generated spatial information 440a. The 3D conversion module 190 may process other frames based on the preliminarily calculated and stored spatial information 440a, thus shortening a calculation time. The 3D conversion module 190 may store spatial information 450b, which is involved in all frames of the scaled-down first picture, in a buffer or memory. In various embodiments, an operation for extracting the spatial information 440b for the rest frame 450 may be performed while the first motion picture is photographing, or may be performed through a background processing while the first motion picture is playing.

After completing the photographing of the first motion picture 410, the 3D conversion module 190 may generate a picture 411 which is transformed into a motion picture format (e.g., MP4) or a still picture format (e.g., PNG), and may store the picture 411 together with spatial information 440a which is generated therefrom.

In various embodiments, in the case that a user selects the stored first picture 411 for 3D view generation, the 3D conversion module 190 may generate a 3D view based on spatial information 412 and spatial information 440b which are stored together.

Figure 4B:
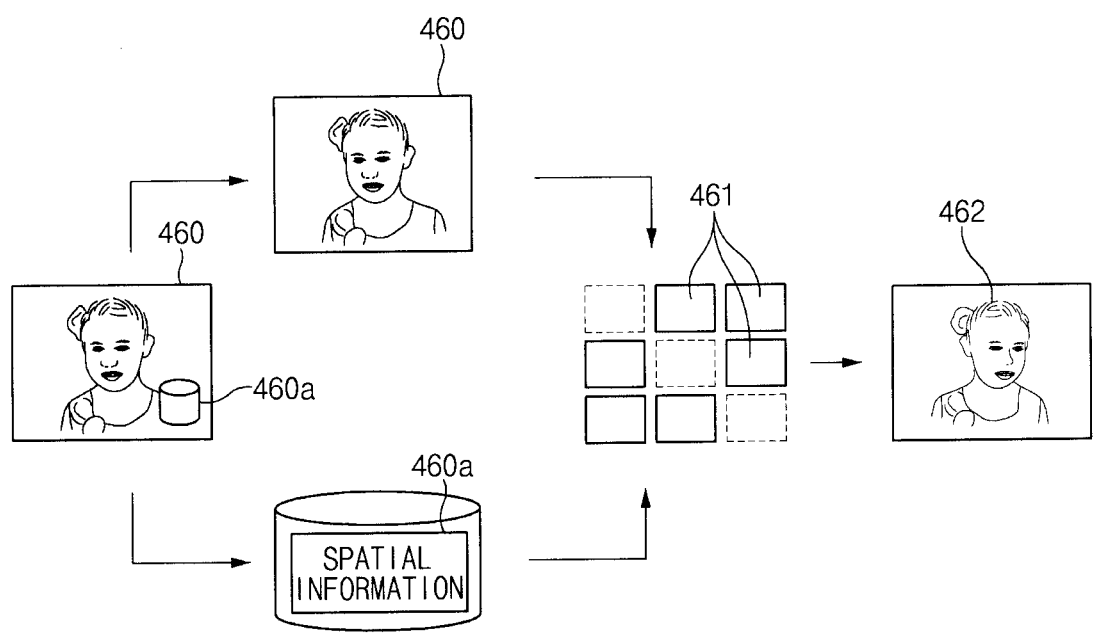
FIG. 4B is an exemplary diagram illustrating a process of generating a 3D view using spatial information and a stored first picture according to various embodiments.

FIG. 4B is an exemplary diagram illustrating a process of generating a 3D view using spatial information and a stored first picture according to various embodiments.

Referring to FIG. 4B, a 3D conversion module 190 may generate a 3D view 462 in real time from a first motion picture 460 and spatial information 460a. The 3D conversion module 190 may extract frame-respective spatial information and a 2D picture from a file of the first motion picture 460 and may decode the picture. A decoded picture may be used for extracting more spatial information through additional calculation. For example, the additional calculation may be performed to further extract information about a frame 461, which is not included in the existing spatial information, as illustrated in FIG. 4B, or may be performed even to improve the accuracy of 3D spatial information (e.g., to expand the accuracy from 3 Degree-Of-Freedom (DOF) information to 6-DOF information). The additional calculation may be used with preliminarily stored spatial information and a decoded picture.

Extracted spatial information may be applied to a decoded picture to generate and display a 3D view 462. A direction or location of the 3D view may be determined in accordance with a direction or location of a user terminal during a playback, a gesture input of a user, or a signal generated by remote control from another device.

Figure 4C:
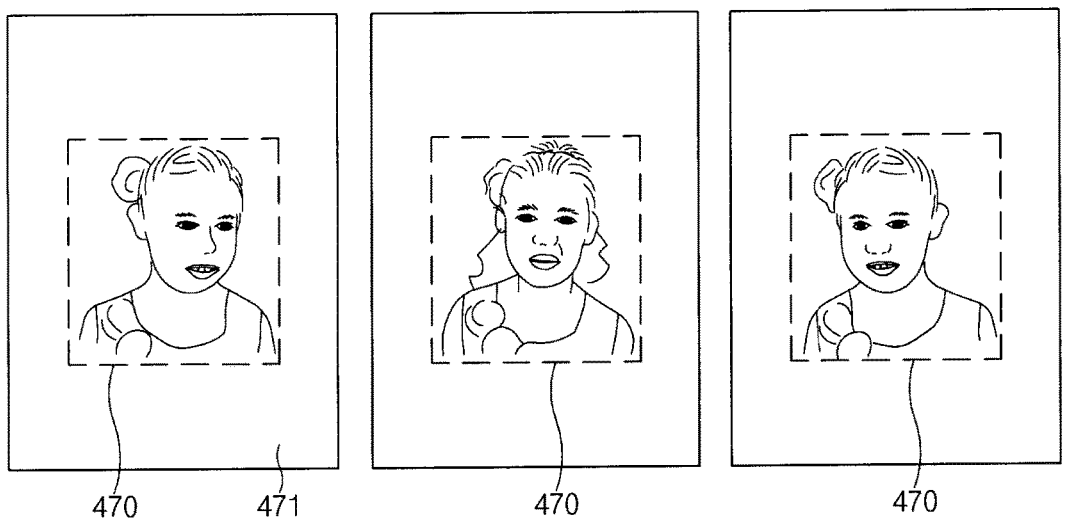
FIG. 4C is an exemplary diagram illustrating a method of generating a 3D view in real time from a 2D picture and spatial information.

FIG. 4C is an exemplary diagram illustrating a method of generating a 3D view in real time from a 2D picture and spatial information.

Referring to FIG. 4C, a 3D conversion module 190 may classify features, which are detected from a picture, and spatial information, which corresponds to an object 470, among spatial information relevant to the features. The 3D conversion module 190 may set an area (i.e., dotted area) formed of features corresponding to the object 470 which is classified, and may generate 3D view information to make the area uniform in at least one of location, size, or direction. The 3D conversion module 190 may use such obtained information about a direction of the object 470 and may select a picture of the object 470, which is rotated by a specific angle from the same input, even to generate 3D view information.

According to various embodiments, in the case of additionally using information about an area (e.g., visage part) where principal features are disposed, the 3D conversion module 190 may set a size and location of the area to be uniform on the same condition even to other pictures. For example, in the case of setting a face or visage to occupy the screen center and ⅓ of the total view angle in a picture which is rotatably photographed on the center with the visage, the 3D conversion module 190 may provide the same 3D view even though the photographing was taken in different intervals.

Figure 4D:
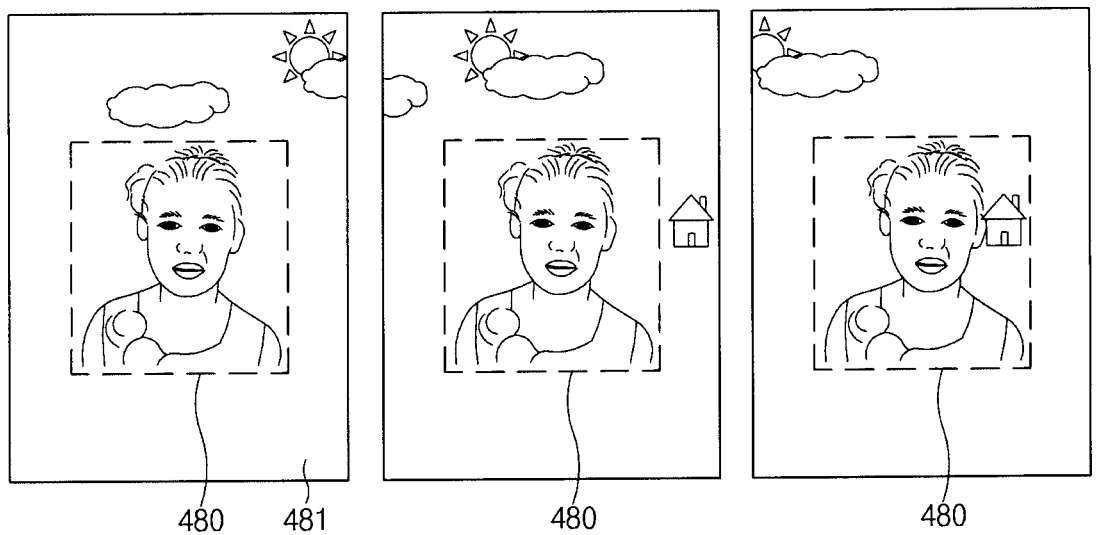
FIG. 4D is an exemplary diagram illustrating a method of generating a 3D view through a background change using a second motion picture and spatial information.

FIG. 4D is an exemplary diagram illustrating a method of generating a 3D view through a background change using a second motion picture and spatial information.

Referring to FIG. 4D, among features, which are detected from a picture, and spatial information involved in the features, a 3D conversion module 190 may classify spatial information corresponding to an object 480, and spatial information corresponding to a background 481 surrounding the circumference of the object 480. The 3D conversion module 190 may set an area (dotted area) formed of features corresponding to an object 480 which is classified, may retain the uniformity of the area in location, size, or direction, and may utilize spatial information of the background 481 to generate a 3D view in which the background rotates. The 3D view with the rotating background 481 may provide a user with a visible effect different from a 3D view in which the object 480 rotates.

Figure 5A:
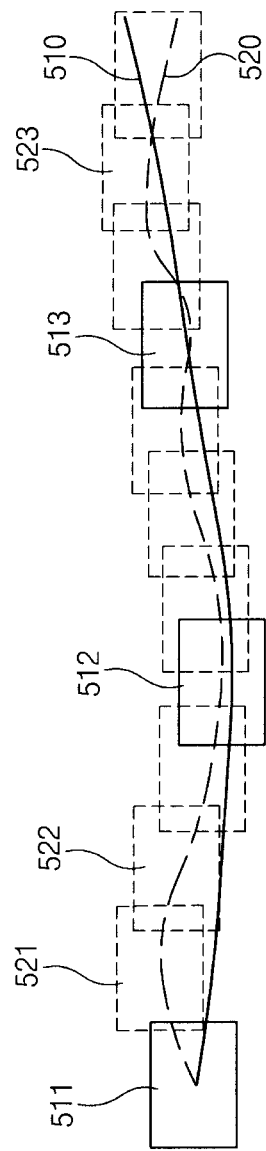
FIG. 5A and FIG. 5B are exemplary diagrams illustrating processes of sampling a second motion picture from a first motion picture according to various embodiments.
Figure 5B:
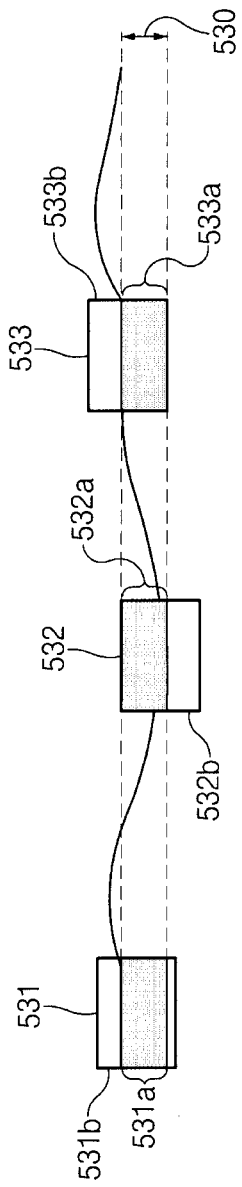

FIGS. 5A and 5B are exemplary diagrams illustrating processes of sampling a second motion picture from a first motion picture according to various embodiments.

FIG. 5A illustrates a process of sampling the second motion picture based on a moving path while an electronic device 101 is photographing an object.

Referring to FIG. 5A, a 3D conversion module 190 may generate the second motion picture based on a moving path of the electronic device 101. If a camera module begins to photograph an object for the first motion picture, the 3D conversion module 190 may sample frames, which form the second motion picture, at points where a photographing path (ideal path) 510 suitable for generating a 3D view intersects or adjoins an actual path 520 of the electronic device 101. The ideal path 510 may be a preliminarily designated path or a path determined by analyzing early frames of the first motion picture. The actual path 520 may be a path identified through a motion sensor included in the electronic device 101.

For example, sampled frames 511, 512, and 513 may be determined as frames forming the second motion picture in the case that the ideal path 510 intersects or adjoins the actual path 520. Otherwise, other frames such as frames 521 and 522 may not be included in the sampled second picture because the ideal path 510 is different more than a specific value from the actual path 520.

According to various embodiments, even in the case that the ideal path 520 intersects or adjoins the actual path 520, some frames may be excluded by a specific condition (e.g., sampling interval). For example, a frame 523 corresponds to the intersection case of the ideal path 510 and the actual path 520, but may be excluded from the second motion picture in consideration of a sampling interval with the frame 513 which has been already sampled.

Figure 6:
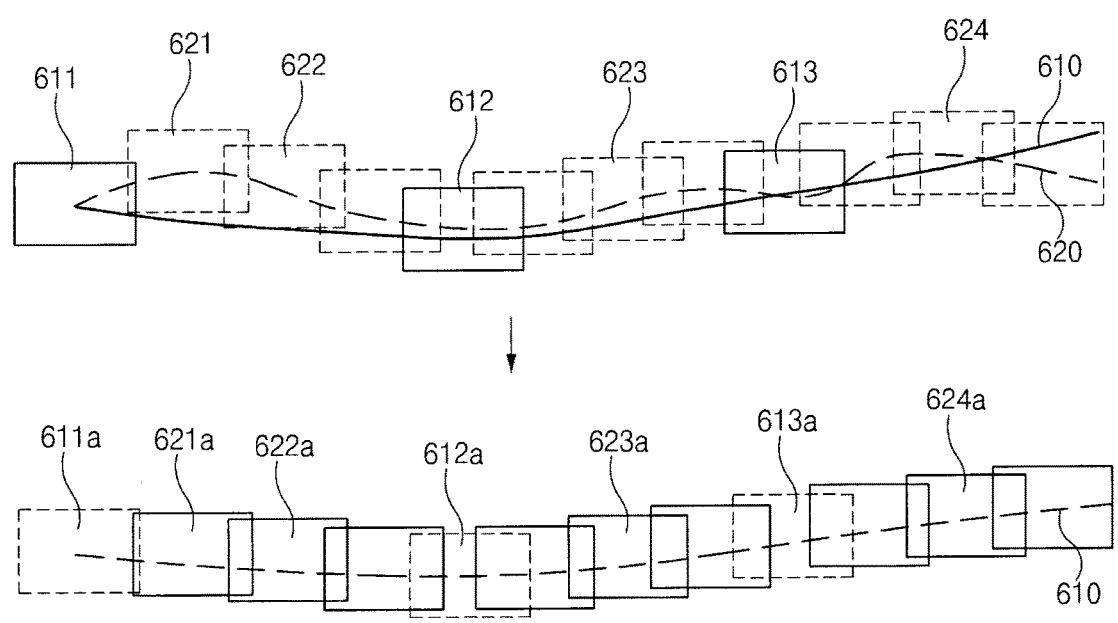
FIG. 6 illustrates a process of correcting a first motion picture using information extracted from a second motion picture according to various embodiments.

According to various embodiments, parameters for correcting other frames (e.g., the frames 521, 522, and 523) of the first motion picture, which are not sampled into the sampled second picture, may be determined based on the sampled frames 511 to 513. Information about the correction parameters may be provided as illustrated in FIG. 6.

FIG. 5B illustrates a process of collecting the sampled second picture by cropping a part of a frame.

Referring to FIG. 5B, if a camera module 180 begins to photograph an object for the first motion picture, a 3D conversion module 190 may remove the reset area except a reference area 530 from each frame, based on identification information of a motion sensor. The reference area 530 may be set as most including the object or features.

For example, for frames 531 to 533, parts of frames 531a, 532a, and 533a, which are included in the reference area 530, may be included in the second motion picture and the remaining portions 531b, 532b, 533c may be cropped and removed therefrom. The 3D conversion module 190 may remove a circumferential area, which does not include an object, to reduce an amount of data to be processed.

The sampling modes illustrated in FIGS. 5A and 5B are exemplary proposed and various embodiments of the present disclosure may not be restrictive hereto. For example, the 3D conversion module 190 may sample the frames based on positional differences of the electronic device 101 photographing the frames, or based in differences of features included in the frames.

According to various embodiments, the respective sampling modes may be even coincidentally performed in combination. For example, as illustrated in FIG. 5A, after the sampling based on the moving path, a part of a sampled frame may be cropped to reduce an amount of data to be processed.

FIG. 6 illustrates a process of correcting a first motion picture using information extracted from a second motion picture according to various embodiments. Although FIG. 6 is illustrated with the sampling mode of FIG. 5A, various embodiments of the present disclosure may not be restrictive hereto.

Referring to FIG. 6, the 3D conversion module 190 may sample the first motion picture at points where the ideal path 610 intersects or adjoins the actual path 620, and then may generate the sampled second picture. In this case, the 3D conversion module 190 may correct other frames of the first motion picture based on frames 611, 612, and 613 of the sampled second picture.

The 3D conversion module 190 may determine correction parameters for the case that frames relatively distant from the ideal path 610 move toward the ideal path 610. Although FIG. 6 is illustrated only in 2D motion, various embodiments of the present disclosure may not be restrictive hereto. For example, correction parameters X, Y, Z, roll, pitch, and yaw may be included therein by 6 DOF.

For example, in the case of sampling the frames 611, 612, and 613 intersecting or adjoining the ideal path 610, other frames 621, 622, 623, and 624, which are not sampled, may shift to frames 621a, 622a, 623a, and 624a on the ideal path 610. In this case, it may be permissible to maintain data in areas where the frames correspond thereto even before and after the shift of the frames. Otherwise, it may be permissible to reflect data, based on the frames 611, 612, and 613 which are sampled before and after the shift, to areas which are lost or added by the shift.

According to various embodiments, during the photographing of the first motion picture, although picture information at locations between the frames 622 and 612 may not be present because a user does not move in a uniform speed, it may be even permissible to additionally generate positional data (not shown) between the locations based on data of the frames 612 and 622.

Figure 7:
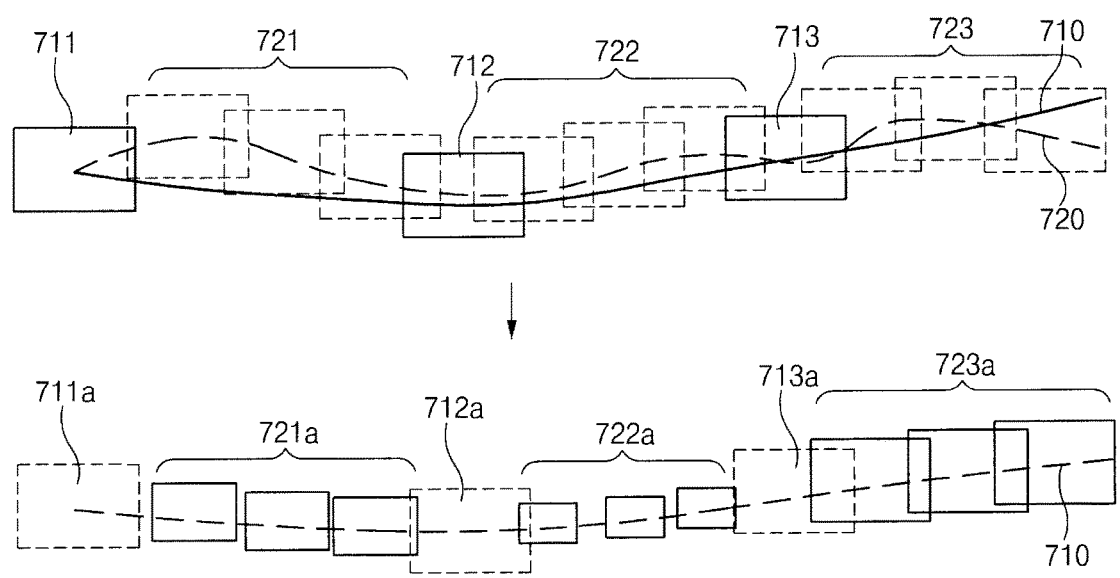
FIG. 7 illustrates a process of correcting a first motion picture based on feature information of a second motion picture according to various embodiments.

FIG. 7 illustrates a process of correcting a first motion picture based on feature information of a sampled second picture according to various embodiments. Although FIG. 7 is illustrated with the sampling mode of FIG. 5A, various embodiments of the present disclosure may not be restrictive hereto.

Referring to FIG. 7, a 3D conversion module may generate the sampled second picture by sampling the first motion picture at points where an ideal path 710 intersects or adjoins an actual path 720. In this case, the 3D conversion module 190 may correct other frames based on frames 711, 712, and 713 of the sampled second picture.

The 3D conversion module 190 may determine a scaling-down degree of other frames based on the number of features respectively included in the sampled frames 711, 712, and 713. For example, in the case that the features are arranged in the order of the frames 711, 712, and 713, a frame area 722 photographed after the frame 712 including a sufficient number of features may be converted into a frame area 722a with the smallest size, having the largest scaling-down degree reflected thereto. A frame area 723 with a small amount of calculation due to a relatively small number of features may be converted into a frame area 723a with the largest size. A frame area 721 with a middle number of features may be converted into a frame area 721a.

As described above, in the case of correcting the first motion picture based on features, it may be permissible to maintain the total amount of calculation in a uniform level, thereby processing data and generating a 3D view in a specific time.

Figure 8:
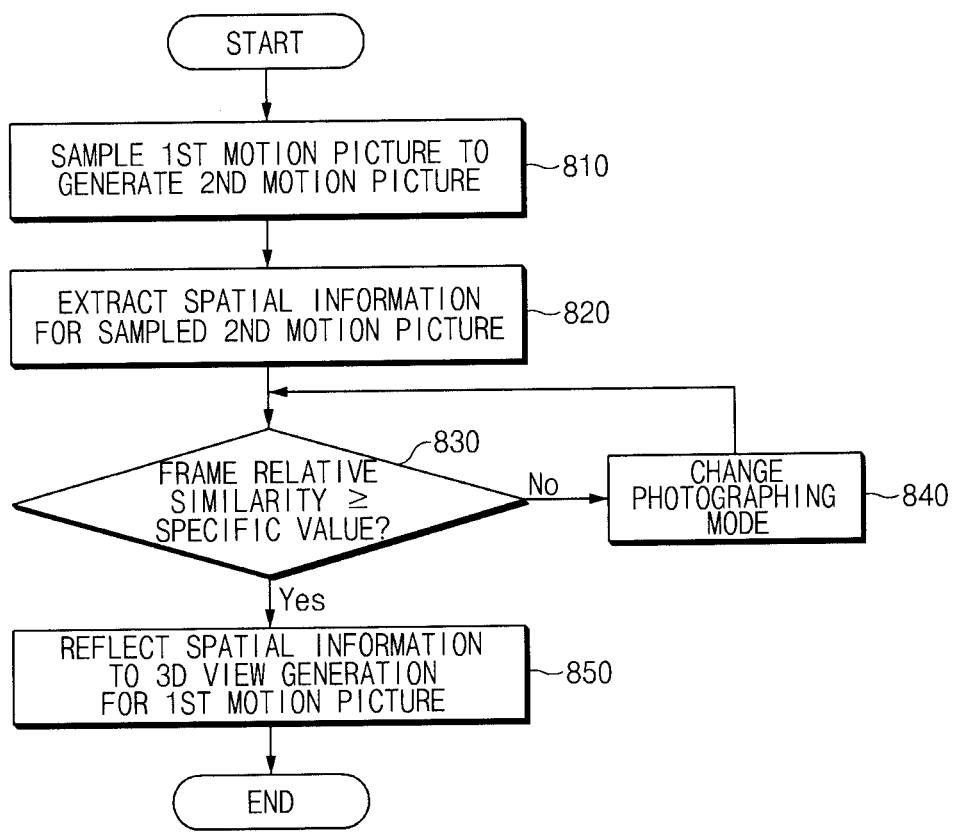
FIG. 8 is a flow chart showing a process of mode change based on a second motion picture according to various embodiments.

FIG. 8 is a flow chart showing a process of mode change based on a second motion picture according to various embodiments.

Referring to FIG. 8, at operation 810, a 3D conversion module 190 may sample a first motion picture and then may generate a second motion picture. A mode of sampling the second motion picture may be performed by using an ideal path or by setting a reference area, thereby resulting in a sampled second picture.

At operation 820, the 3D conversion module 190 may extract spatial information such as features, depths for the generated second picture.

At operation 830, the 3D conversion module 190 may determine whether the relative similarity for each frame of the sampled second picture is equal to or higher than a specific value. The 3D conversion module 190 may confirm the relative similarity by comparing features of each frame each other in number, distribution, and similarity.

At operation 840, in the case that the relative similarity is lower than the specific value, the 3D conversion module 190 may change a photographing mode. This is because low relative similarity thereof indicates that the currently photographing first picture is varying to a state which is unsuitable to be converted into a 3D view. The 3D conversion module 190 may detect additional features, through a change of a photographing mode, and may correct an error. Additional information about the photographing mode change may be provided through the flow shown in FIG. 9.

At operation 850, in the case that the relativity is equal to or higher than the specific value, extracted spatial information may be reflected to generation of a 3D view for the first motion picture.

Figure 9:
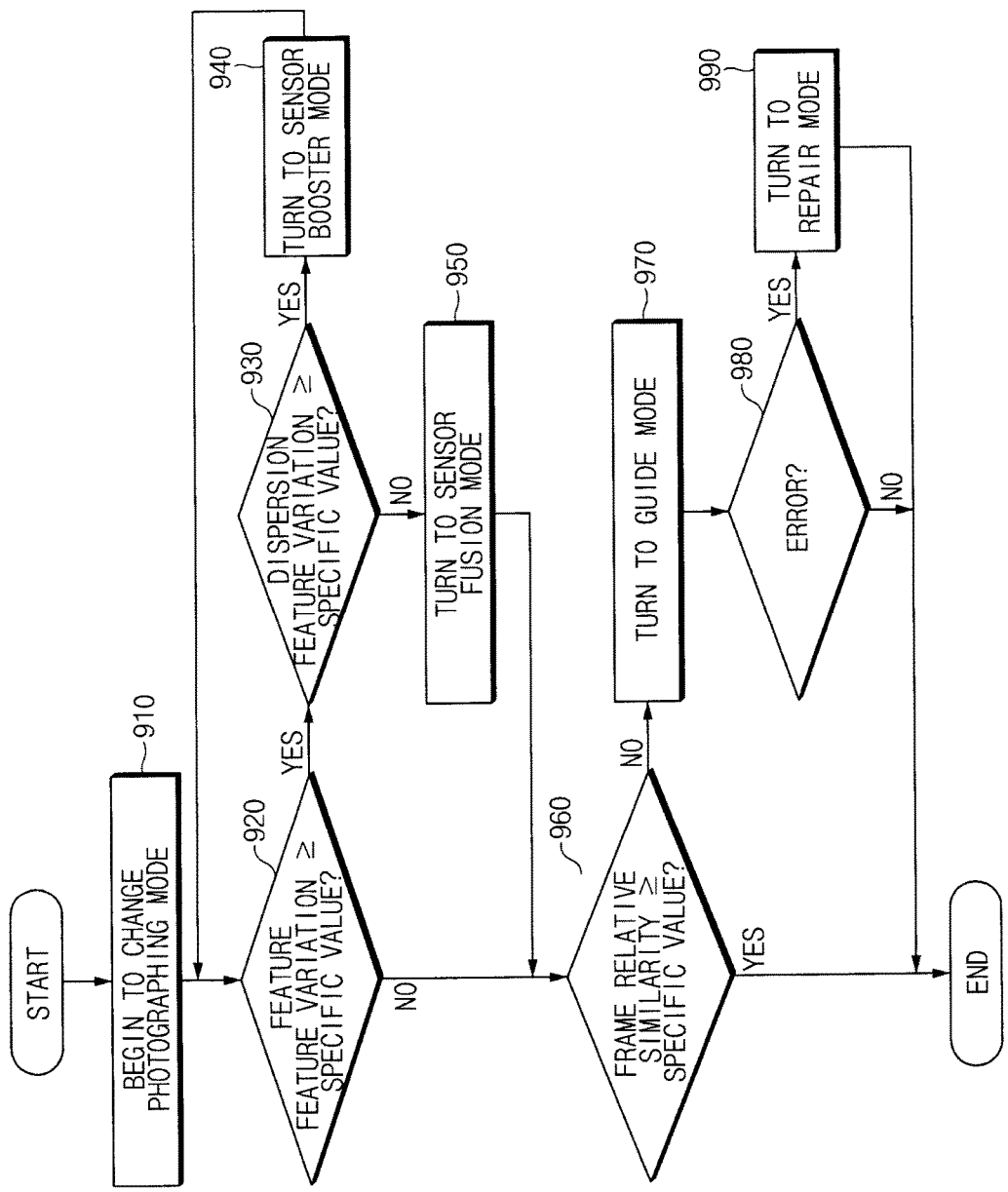
FIG. 9 is a flow chart showing a process of photographing mode change according to various embodiments.

FIG. 9 is a flow chart showing a process of photographing mode change according to various embodiments.

Referring to FIG. 9, at operation 910, a 3D conversion module 190 may begin to change a photographing mode.

At operation 920, the 3D conversion module 190 may determine whether there is a variation of features in a degree equal to or larger than a specific value between two continuous frames of a second motion picture. For example, in the case that an object includes a shadow area or abruptly varies in feature, the features between two continuous frames may vary in a degree equal to or larger than a specific value.

At operation 930, in the case the features vary in a degree equal to or larger than the specific value, the 3D conversion module 190 may determine whether a dispersion value of the features between the two frames varies in a degree equal to or larger than a specific value.

At operation 940, in the case that the dispersion value of the features varies in a degree equal to or larger than the specific value (e.g., the case that a shadow partly appears in the area of an object), the 3D conversion module 190 may change a photographing mode to a sensor booster mode. The sensor booster mode may change at least one of an operating speed, sensitivity, and exposure time for an image sensor to make features easily extracted.

At operation 950, in the case that the dispersion value of the features does not vary in a degree equal to or larger than the specific value (e.g., the case that a photographing area turns to the head, which has relatively small feature information, in the visage which has relatively many feature information), the 3D conversion module 190 may change a photographing mode to a sensor fusion mode. The sensor fusion mode may utilize a plurality of sensors.

At operation 960, the 3D conversion module 190 may determine whether the relative similarity of features between the two frames is equal to or higher than a specific value. In the case that the similarity between the frames is equal to or higher than a specific value, the 3D conversion module 190 may terminate the process of photographing mode change.

At operation 970, in the case that the relative similarity of features is lower than the specific value, the 3D conversion module 190 may change a photographing mode to a guide mode. The guide mode may guide a user to a photographing direction or a photographing mode.

For example, in the case that a user changes a location or angle of a camera or object over a specific range while horizontally rotating the camera or object, an electronic device 101 may output a message to return the camera or object to its previous location and thereby may guide the user. Additionally, in the case that a user rotates a direction of a camera or object too fast, the electronic device 101 may output a message to guide the user.

At operation 980, the 3D conversion module 190 may determine whether there is an error such as a hole.

At operation 990, in the case that there is an error, the 3D conversion module 190 may change a photographing mode to a repair mode. The repair mode may use a preliminarily stored 3D view to compensate an area in which the error occurs.

Figure 10:
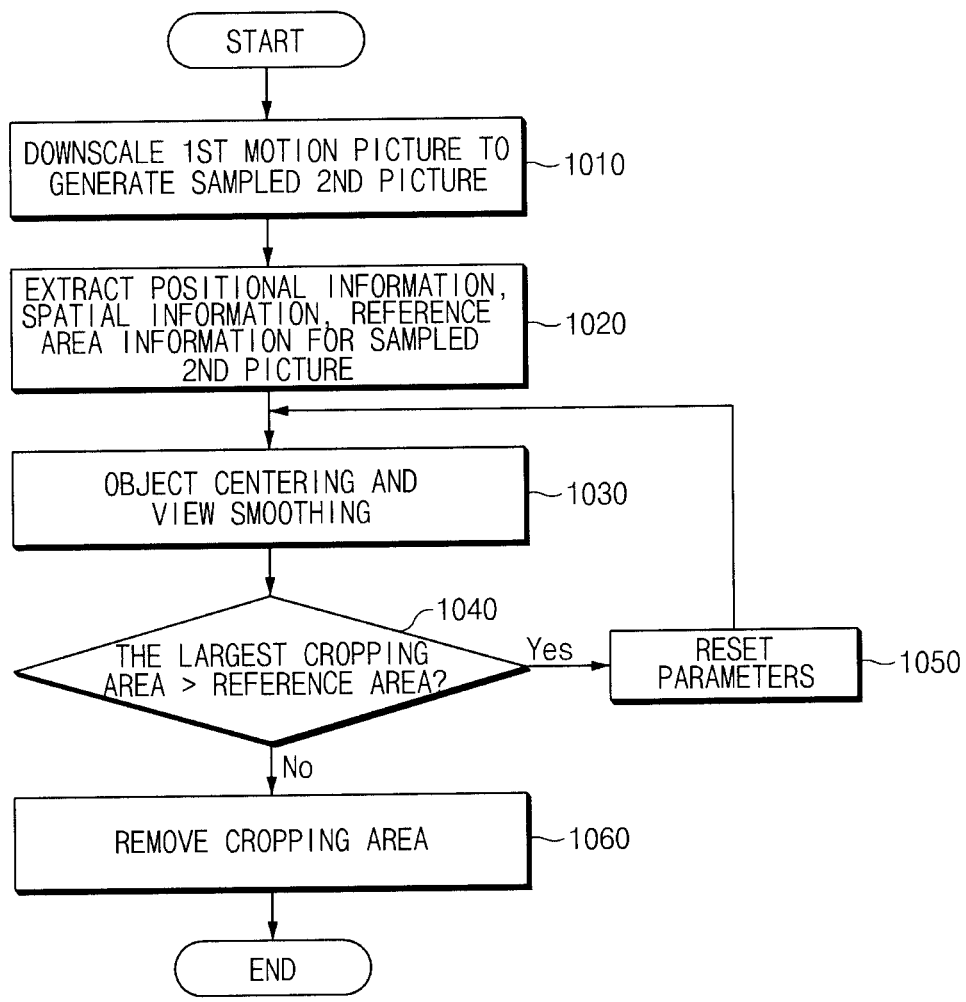
FIG. 10 is a flow chart showing an object centering process according to various embodiments.

FIG. 10 is a flow chart showing an object centering process according to various embodiments.

Referring to FIG. 10, at operation 1010, a 3D conversion module 190 may sample a part of frames from a first motion picture and then may generate a sampled second picture.

At operation 1020, the 3D conversion module 190 may extract photographing positional information of the electronic device 101, spatial information, and reference area information, respective to frames of the sampled second picture. The reference area may be preliminarily set in a specific size. For example, the reference area may be set in a specific part which corresponds to 20% of the total frame area.

At operation 1030, the 3D conversion module 190 may perform an object centering process and a view smoothing process for an object. The object centering process may set the center of a screen in consideration of the number or distribution of extracted features. For example, assuming that an object from which features are uniformly detected to all locations, the center of a screen may become a geometrical center of a figure (e.g., tetragon) in which features detected in corresponding directions are confined in the least area. In various embodiments, the 3D conversion module 190 may even shift an area, which has the most number of features, to the center (the center of density) of a screen. Otherwise, the 3D conversion module 190 may even shift a preliminarily designated object (e.g., visage) to the center of a screen. The view smoothing process may lessen interframe heterogeneity which arises from the object centering process.

Through the object centering process and/or the view smoothing process, the largest cropping area may be extracted. For the object centering process or the view smoothing process, the largest cropping area may be a cropping area in a frame which has the largest part (the rest part except an area including an object) to be cropped.

At operation 1040, the 3D conversion module 190 may determine whether the largest cropping area is wider than the reference area.

At operation 1050, in the case that the largest cropping area is wider than the reference area, the 3D conversion module 190 may reset parameters to weakly perform the object centering or view smoothing process. Through this operation, the largest cropping area may be scaled down to extend the remaining area on the object.

During the operation 1060, in the case that the largest cropping area is equal to or smaller than the reference area, the 3D conversion module 190 may determine a cropping area and may progress a cropping process therewith.

According to various embodiments, an image processing method performed in an electronic device may include collecting a first motion picture, extracting spatial information for at least a part of frames among frames forming the first motion picture, and reflecting the extracted spatial information to generation of a 3D view corresponding to the first motion picture.

According to various embodiments, the collecting of the first motion picture may include obtaining a first 2D image corresponding to a first direction of an object, and a second 2D image corresponding to a second direction of the object. The extracting of the spatial information may include determining the spatial information based on at least a part of the first 2D image and the second 2D image. The determining of the spatial information may include determining a first feature of the first 2D image and a second feature of the second 2D image corresponding to the first feature; and based on at least a part of the first feature and the second feature, determining a location or direction of the object as at least a part of the spatial information. The spatial information may be stored together with at least a part of the first 2D image and the second 2D image.

According to various embodiments, reflecting to the 3D view generation may include determining a third direction based on the first direction and the second direction, and generating a 3D image of the object based on the third direction.

According to various embodiments, the reflecting to the 3D view generation may include correcting a plurality of images, which correspond to a plurality of directions, based on the spatial information, and providing the 3D view based on the correcting. The correcting may include generating a virtual ideal path of the electronic device, and correcting a location of at least one of a plurality of images based on the virtual ideal path and the spatial information.

According to various embodiments, the extracting of the spatial information may include determining the part of frames by scaling down or sampling the first image under a specific condition.

According to various embodiments, the extracting of the spatial information may include, if an ideal path intersects an actual path along which the electronic device moves or the ideal path adjoins the actual path in a specific range, sampling the first motion picture. The extracting of the spatial information may include extracting a correction parameter for converting a non-sampled frame of the first motion picture into a frame photographed on the ideal path.

According to various embodiments, the extracting of the spatial information may include scaling down non-sampled frames of the first motion picture based on the number of features included in each frame determined as the part of frames.

According to various embodiments, the extracting of the spatial information may include determining the part of frames based on image data included in a reference area of each of frames forming the first motion picture. The extracting of the spatial information may include extracting at least one of information about a feature and a depth for each frame determined as the part of frames, or information about a location of the electronic device photographing each frame.

According to various embodiments, the reflecting to the 3D view generation may include changing a photographing mode of the first motion picture based on the spatial information. The changing of the photographing mode may include, if a feature between continuous frames forming the part of frames varies in a degree equal to or higher than a specific value and a dispersion value of the feature varies in a degree equal to or higher than a specific value, collecting the first motion picture by a first mode. The first mode may collect a first motion picture by changing at least one of an operating speed, sensitivity, and an exposure time of an image sensor.

According to various embodiments, the changing of the photographing mode may include, if a feature between continuous frames forming the part of frames varies in a degree equal to or higher than a specific value and a dispersion value of the feature varies in a degree lower than a specific value, collecting the first motion picture by a second mode. The second mode may use a plurality of sensors to collect the first motion picture.

According to various embodiments, the changing of the photographing mode may include, if relativity between frames included in the part of frames is lower than a specific value collecting the first motion picture in a third mode guiding a user to a photographing direction or a photographing speed.

Figure 11:
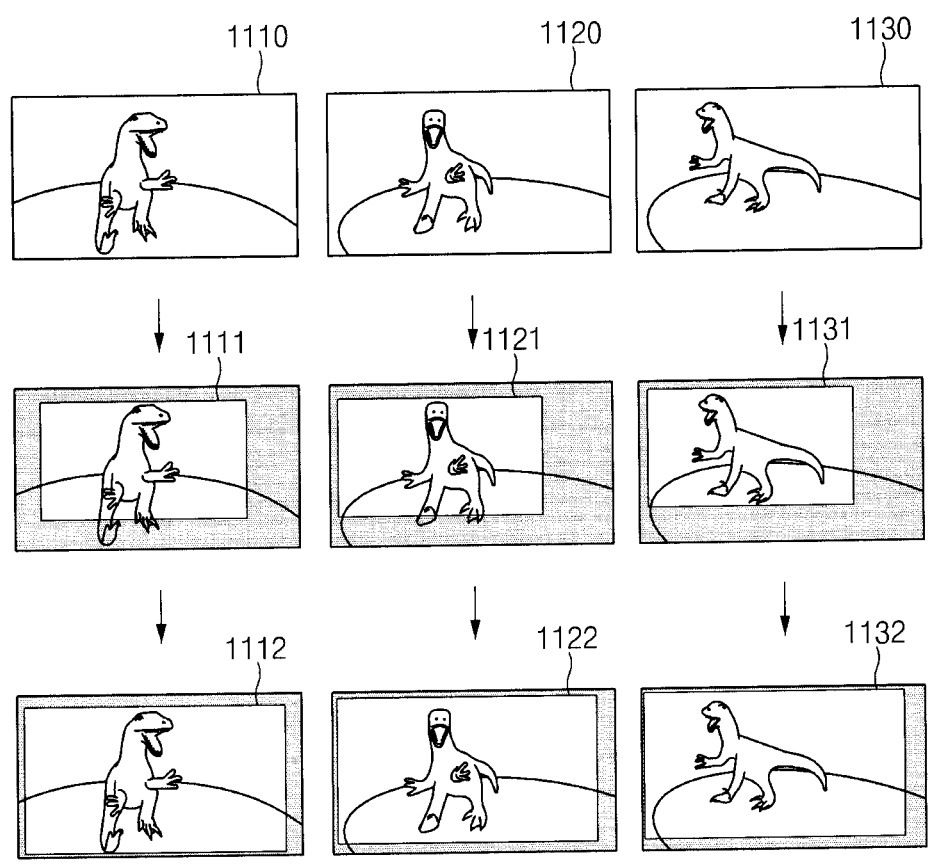
FIG. 11 is an exemplary diagram illustrating screens for an object centering process according to various embodiments.

FIG. 11 is an exemplary diagram illustrating screens for an object centering process according to various embodiments.

In the case that a user cannot photograph an object while laying the object on the center of a screen, the 3D conversion module 190 may shift the object to the center of the screen through a centering process.

For example, in the case of sampling first to third frames 1110 to 1130, an object may be laid at the center, or even at the left or right side of a screen in each of sampled frames.

The 3D conversion module 190 may extract photographing positional information of an electronic device 101, spatial information of an object, and information of a reference area. The reference area may be a part in which features of the object are mainly disposed.

In the case that the largest cropping area is larger than the reference area, the 3D conversion module 190 may inadvertently remove a part of features of an object on the center of the object through the cropping process. To prevent this, the 3D conversion module 190 may reset the remaining area and then may allow the edge of the screen to be cropped to remain the object.

The 3D conversion module 190 may perform the object centering process or the view smoothing process for frames 1110, 1120, and 1130 to obtain frames 1111, 1121, and 1131, respectively. In this case, although the centering is successful on the center of the screen, features of the object may be cropped because of that.

The 3D conversion module 190 may control parameters to weakly perform the object centering process or the view smoothing process. Through this procedure, the frames 1111, 1121, and 1131 may be respectively converted into frames 1112, 1122, and 1132. The frames 1112, 1122, and 1132 are relatively weakened in effect of the object centering process, but features of the object may be maintained without the cropping.

Figure 12A:
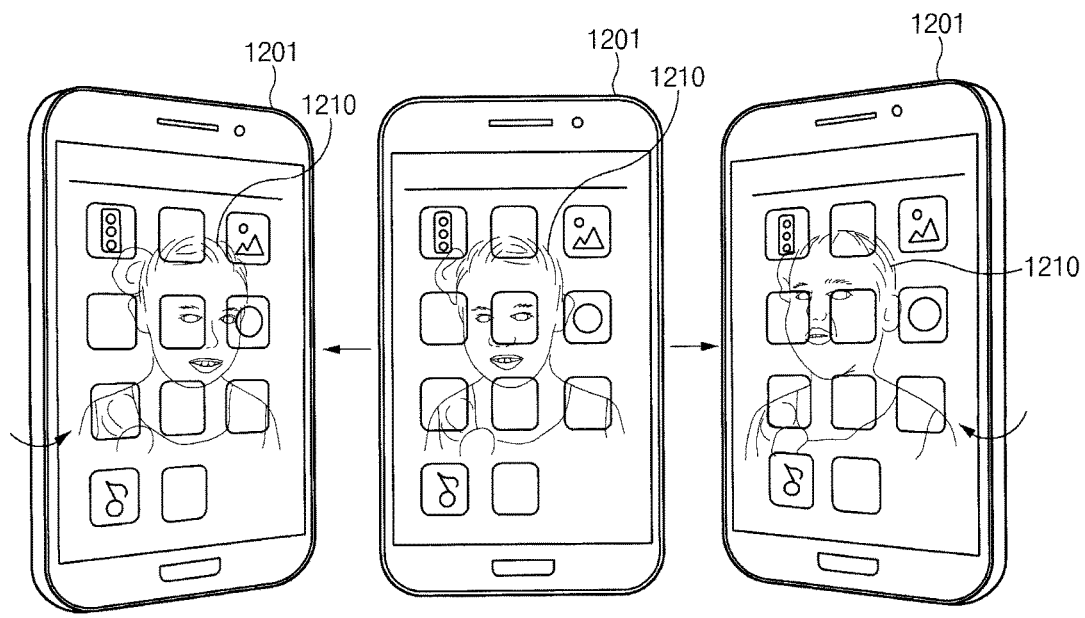
FIG. 12A and FIG. 12B are exemplary diagrams illustrating screens using 3D views according to various embodiments.
Figure 12B:
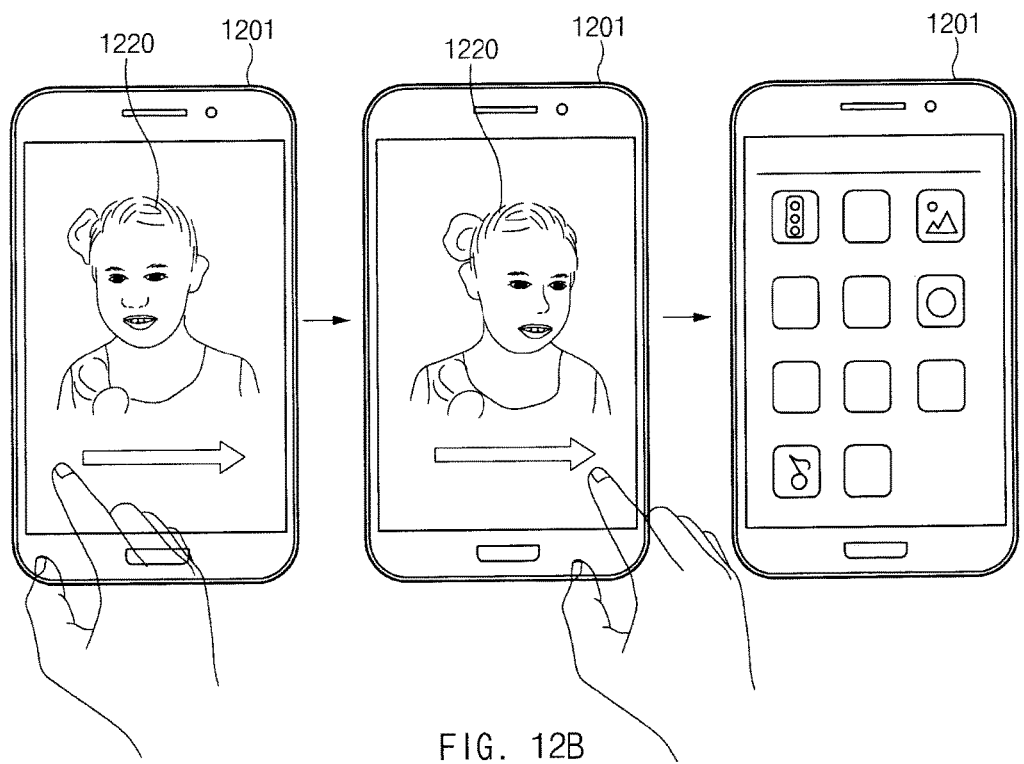

FIGS. 12A and 12B are exemplary diagrams illustrating screens using 3D views according to various embodiments. FIGS. 12A and 12B are illustrated as using 3D views but the various embodiments of the present disclosure may not be restrictive hereto.

Referring to FIG. 12A, a 3D conversion module 190 may generate a 3D view 1210 for a first motion picture based on spatial information of a second motion picture. The 3D view 1210 may be generated by utilizing the spatial information of the second motion picture which is scaled down or sampled. For example, in the case that the 3D conversion module 190 performs 6-DOF calculation for the second motion picture, 3-DOF calculation for the first motion picture may be performed to simplify the calculation process. The 3D conversion module 190 may generate the 3D view 1210, through a background processing, at the almost same time of completing the photographing of the first motion picture or while playing the photographed result.

In various embodiments, the 3D view 1210 may be used for a background of the screen. In the case of setting the 3D view 1210 in the background of the screen, it may be permissible to differentiate a plane, on which the 3D view 1210 is output, in accordance with a detection state of a motion sensor.

For example, in the case that a user is facing and holding an electronic device 1201, the front of the 3D view 1210 may be displayed on the screen. In the case that a user rotates the electronic device 1210 in the left and right directions, the 3D view 1210 may be rotated by reflecting a rotating direction and strength thereto.

Referring to FIG. 12B, a 3D view 1220 may be used for unlocking a screen. For example, in a locking state, the front of the 3D view may be displayed on the screen. In the case that a user touches, for unlocking, and swipes the screen from the left to the right, the 3D view 1220 may be rotated in response to the swiping operation. By the rotation of the 3D view 1220, the screen may be unlocked.

Figure 13:
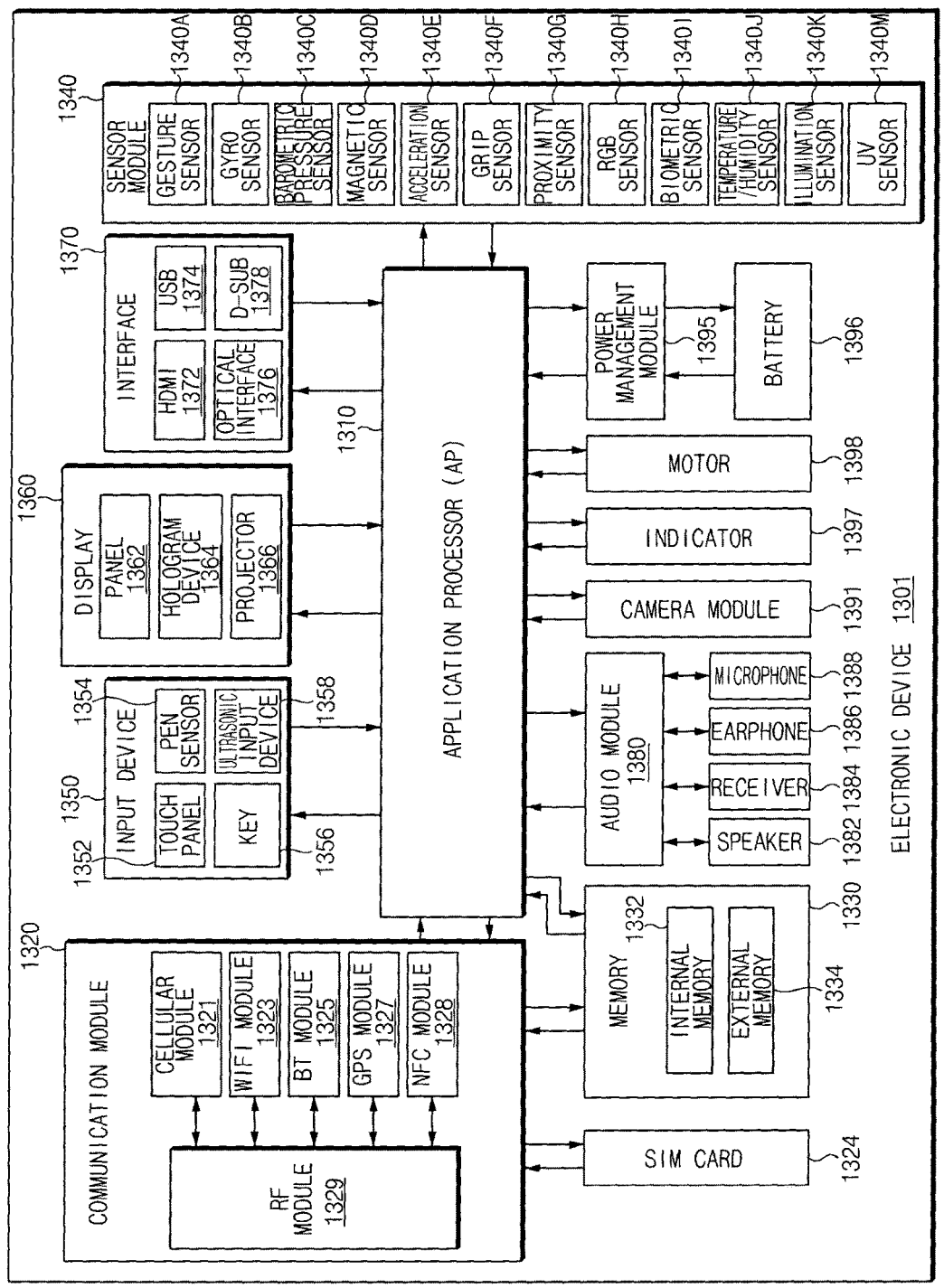
FIG. 13 is a block diagram illustrating an electronic device according to various embodiments.

FIG. 13 is a block diagram 1300 illustrating an electronic device 1301 according to various embodiments.

Referring to FIG. 13, the electronic device 1301 may include, for example, all or a part of elements of the electronic device 101 shown in FIG. 1. The electronic device 1301 may include at least one of one or more Application Processors (AP) 1310, a communication module 1320, a Subscriber Identification Module (SIM) card 1324, a memory 1330, a sensor module 1340, an input unit 1350, a display 1360, an interface 1370, an audio module 1380, a camera module 1391, a power management module 1395, a battery 1396, an indicator 1397, or a motor 1398.

The processor 1310 may drive an Operating System (OS) or an application to control a plurality of hardware or software elements connected to the processor 1310 and may process and compute a variety of data including multimedia data. The processor 1310 may be implemented with a System-on-Chip (SoC), for example. According to an embodiment, the AP 810 may further include a Graphic Processing Unit (GPU) and/or an image signal processor. The processor 1310 may even include at least a part of the elements shown in FIG. 13. The processor 1310 may load and process instructions or data, which are received from at least one of other elements (e.g., a nonvolatile memory), and then store diverse data into a nonvolatile memory.

The communication module 1320 may have a configuration same with or similar to the communication interface 170 of FIG. 1. The communication module 1320 may include a cellular module 1321, a WiFi module 1323, a Bluetooth module 1325, a GPS module 1327, an NFC module 1328, and a Radio Frequency (RF) module 1329.

The cellular module 1321 may provide voice call, video call, a character service, or an Internet service through a communication network. According to an embodiment, the cellular module 1321 may perform discrimination and authentication of an electronic device within a communication network using a subscriber identification module (e.g., a SIM card) 1324. According to an embodiment, the cellular module 1321 may perform at least a portion of functions that the processor 1310 provides. According to an embodiment, the cellular module 821 may include a communication processor (CP).

Each of the WiFi module 1323, the Bluetooth module 1325, the GPS module 1327, and the NFC module 1328 may include a processor for processing data exchanged through a corresponding module, for example. In some embodiments, at least a part (e.g., two or more elements) of the cellular module 1321, the WiFi module 1323, the Bluetooth module 1325, the GPS module 1327, and the NFC module 1328 may be included within one integrated circuit (IC) or an IC package.

The RF module 1329 may transmit and receive, for example, communication signals (e.g., RF signals). The RF module 1329 may include a transceiver, a Power Amplifier Module (PAM), a frequency filter, a Low Noise Amplifier (LNA), or an antenna. According to another embodiment, at least one of the cellular module 1321, the WiFi module 1323, the Bluetooth module 1325, the GPS module 1327, and the NFC module 1328 may transmit and receive an RF signal through a separate RF module.

The SIM card 1324 may include, for example, a card, which has a subscriber identification module, and/or an embedded SIM, and include unique identifying information (e.g., Integrated Circuit Card Identifier (ICCID)) or subscriber information (e.g., integrated mobile subscriber identify (IMSI)).

The memory 1330 (e.g., the memory 130 of FIG. 1) may include, for example, an embedded memory 1332 or an external memory 1334. For example, the embedded memory 832 may include at least one of a volatile memory (e.g., a dynamic RAM (DRAM), a Static RAM (SRAM), a Synchronous Dynamic RAM (SDRAM), etc.), a nonvolatile memory (e.g., a One-time Programmable ROM (OTPROM), a programmable ROM (PROM), an Erasable and Programmable ROM (EPROM), an Electrically Erasable and Programmable ROM (EEPROM), a mask ROM, a flash ROM, a NAND flash memory, a NOR flash memory, etc.), a hard drive, or Solid State Drive (SSD).

The external memory 1334 may further include a flash drive, for example, a Compact Flash (CF), a Secure Digital (SD), a micro-SD, a mini-SD, an extreme Digital (xD), MultiMedia Card (MMC), or a memory stick. The external memory 1334 may be functionally connected with the electronic device 1301 through various interfaces.

The sensor module 1340 may measure, for example, a physical quantity, or detect an operation state of the electronic device 800, to convert the measured or detected information to an electric signal. The sensor module 1340 may include at least one of a gesture sensor 1340A, a gyro sensor 1340B, a barometer pressure sensor 1340C, a magnetic sensor 1340D, an acceleration sensor 1340E, a grip sensor 1340F, a proximity sensor 1340G, a color sensor 1340H (e.g., RGB sensor), a biometric sensor 1340I, a temperature/humidity sensor 840J, an illuminance sensor 1340K, or an UV sensor 1340M. Additionally or generally, though not shown, the sensor module 1340 may further include an E-nose sensor, an Electromyography Sensor (EMG) sensor, an ElectroEncephaloGram (EEG) sensor, an ElectroCardioGram (ECG) sensor, an infrared (IR) sensor, an iris sensor, or a fingerprint sensor, for example. The sensor module 840 may further include a control circuit for controlling at least one or more sensors included therein. In some embodiments, the electronic device 1301 may further include a processor, which is configured to control the sensor module 1340, as a part or additional element, thus controlling the sensor module 840 while the processor 1310 is in a sleep state.

The input unit 1350 may have a configuration similar to the input/output interface 150 of FIG. 1. Additionally, the display 160 may partly perform a function of the input/output unit 1350 in the case that it is made up with a touch panel. The input unit 1350 may include, for example, a touch panel 1352, a (digital) pen sensor 1354, a key 1356, or an ultrasonic input unit 1358. The touch panel 1352 may recognize, for example, a touch input using at least one of a capacitive type, a resistive type, an infrared type, or an ultrasonic wave type. Additionally, the touch panel 1352 may further include a control circuit. The touch panel 1352 may further include a tactile layer to provide a tactile reaction for a user.

The (digital) pen sensor 1354 may be a part of the touch panel 1352, or a separate sheet for recognition. The key 1356, for example, may include a physical button, an optical key, or a keypad. The ultrasonic input unit 1358 may allow the electronic device 1301 to detect a sound wave using a microphone (e.g., a microphone 1388), and determine data through an input tool generating an ultrasonic signal.

The display 1360 (e.g., the display 160) may have the same or similar configuration with the display 160, including a panel 1362, a hologram device 1364, or a projector 1366. The panel 1362 may include the same or similar configuration with the display 160 of FIG. 1. The panel 1362, for example, may be implemented to be flexible, transparent, or wearable. The panel 1362 and the touch panel 1352 may be implemented in one module. The hologram device 1364 may show a three-dimensional picture in a space using interference of light. The projector 1366 may project light onto a screen to display a picture. The screen, for example, may be positioned in the inside or outside of the electronic device 1301. According to an embodiment, the display 1360 may further include a control circuit for controlling the panel 1362, the hologram device 1364, or the projector 1366.

The interface 1370, for example, may include a high-definition multimedia interface (HDMI) 1372, a USB 1374, an optical interface 1376, or a D-sub (D-subminiature) 1378. The interface 1370 may include, for example, the communication interface 170 shown in FIG. 1. The interface 1370, for example, may include a Mobile High-definition Link (MHL) interface, an SD card/MMC interface, or an Infrared Data Association (IrDA) standard interface.

The audio module 1380 may have the same or similar configuration with the input/output interface 150 of FIG. 1 and may convert, for example, sound and an electric signal in dual directions. At least a part of elements of the audio module 1380 may be included, for example, in the input/output interface 150 shown in FIG. 1. The audio module 1380, for example, may process sound information which is input or output through a speaker 1382, a receiver 1384, an earphone 1386, or a microphone 1388.

The camera module 1391 may be a unit which is capable of taking a still picture and a moving picture. According to an embodiment, the camera module 1391 may include one or more image sensors (e.g., a front sensor or a rear sensor), a lens, an Image Signal Processor (ISP), or a flash (e.g., an LED or a xenon lamp).

The power management module 1395 may manage, for example, power of the electronic device 1301. The power management module 1395 may include, for example, a Power Management Integrated Circuit (PMIC), a charger integrated circuit, or a battery or fuel gauge. The PMIC may operate in wired and/or wireless charging mode. A wireless charging mode may include, for example, diverse types of magnetic resonance, magnetic induction, or electromagnetic wave. For the wireless charging, an additional circuit, such as a coil loop circuit, a resonance circuit, or a rectifier, may be further included therein. The battery gauge, for example, may measure a remnant of the battery 1396, a voltage, a current, or a temperature during charging. The battery 1396 may include, for example, a rechargeable battery and/or a solar battery.

The indicator 1397 may have the same or similar configuration with the input/output interface 150 and may display the specific states of the electronic device 1301 or a part (e.g., the processor 1310) thereof, e.g., a booting state, a message state, or a charging state. The motor 1398 may convert an electric signal into mechanical vibration and generate a vibration or haptic effect. Although not shown, the electronic device 1301 may include a processing unit (e.g., a GPU) for supporting a mobile TV. The processing unit for supporting the mobile TV, for example, may process media data that is based on the standard of Digital Multimedia Broadcasting (DMB), Digital Video Broadcasting (DVB), or Media Flow (MediaFlo™).

Each of the above-described elements of the electronic device according to an embodiment of the present disclosure may be implemented using one or more components, and a name of a relevant component may vary with on the kind of the electronic device. The electronic device according to various embodiments of the present disclosure may include at least one of the above components. Also, a part of the components may be omitted, or additional other components may be further included. Also, some of the components of the electronic device according to the present disclosure may be combined to form one entity, thereby making it possible to perform the functions of the relevant components substantially the same as before the combination.

According to various embodiments, an electronic device with a camera module, the electronic device may include the camera module configured to photograph a picture, and a 3D conversion module configured to generate a 3D view based on the picture, wherein the camera module begins to collect a first motion picture, and wherein the 3D conversion module generates a 3D view corresponding to the first motion picture based on spatial information about at least a part of frames forming the first motion picture. The electronic device may further include a sensor module, wherein the 3D conversion module extracts spatial information about a second motion picture based on information collected through the sensor module.

Figure 14:
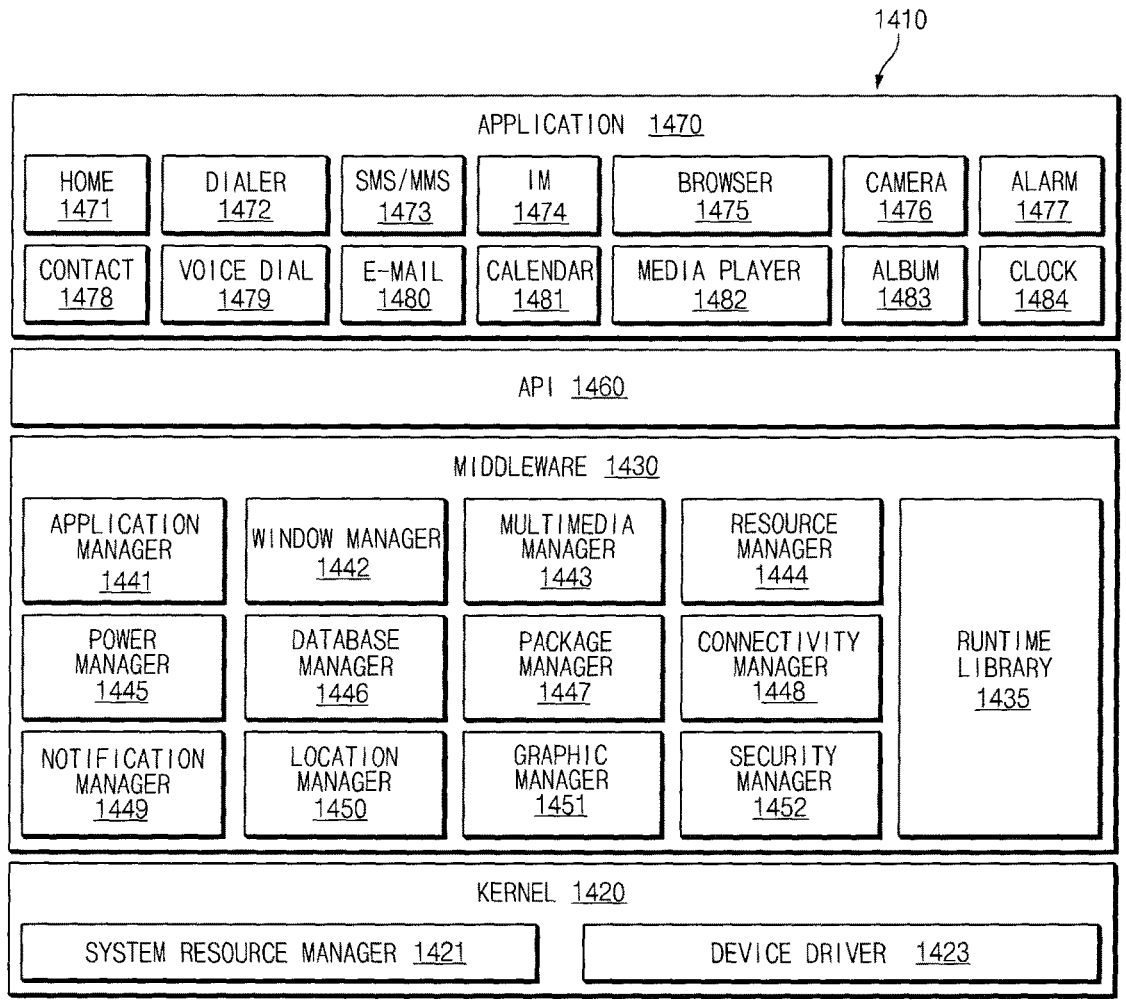
FIG. 14 is a block diagram illustrating a program module according to various embodiments.

FIG. 14 is a block diagram illustrating a program module 1410 according to various embodiments.

Referring to FIG. 14, according to an embodiment, the program module 1410 may include an operating system (OS) to control resources relevant to an electronic device (e.g., the electronic device 101), and/or diverse applications driven on the operating system. The operating system may be, for example, ANDROID, iOS, WINDOWS, SYMBIAN, TIZEN, or BADA operating systems.

The program module 1410 may include a kernel 1420, a middleware 1430, an API 960, and/or an application 1470. At least a part of the program module 1410 may be preloaded on an electronic device, or may be downloadable from an external electronic device.

The kernel 1420 may include, for example, a system resource manager 1421 or a device driver 1423. The system resource manager 1421 may perform control, allocation, or retrieval of system resources. According to an embodiment, the system resource manager 1421 may include a process managing part, a memory managing part, or a file system managing part. The device driver 1423 may include, for example, a display driver, a camera driver, a BLUETOOTH wireless communications driver, a common memory driver, an USB driver, a keypad driver, a WiFi driver, an audio driver, or an inter-process communication (IPC) driver.

The middleware 1430 may provide, for example, a function necessary for the application 1470 in common, or provide diverse functions to the application 1470 through the API 1460 to allow the application 1470 to efficiently use limited system resources of the electronic device. According to an embodiment, the middleware 1430 may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, or a security manager 1452.

The runtime library 1435 may include, for example, a library module which is used by a compiler to adding a new function through a programming language while the application 1470 is being executed. The runtime library 1435 may perform input/output management, memory management, or capacities about arithmetic functions.

The application manager 1441 may manage, for example, a life cycle of at least one application of the application 1470. The window manager 1442 may manage a GUI resource which is used in a screen. The multimedia manager 1443 may identify a format necessary for playing diverse media files, and perform an encoding or decoding work for media files by using a codec suitable for the format. The resource manager 1444 may manage resources such as a storage space, memory, or source code of at least one application of the application 1470.

The power manager 1445, for example, may operate with a basic input/output system (BIOS) to manage a battery or power, and provide power information for an operation of an electronic device. The database manager 1446 may generate, search, or modify a database which is to be used in at least one application of the application 1470. The package manager 1447 may install or update an application which is distributed in a form of package file.

The connectivity manager 1448 may manage, for example, wireless connection such as WiFi or Bluetooth. The notification manager 1449 may display or notify an event such as arrival message, promise, or proximity notification in a mode that does not disturb a user. The location manager 1450 may manage location information of an electronic device. The graphic manager 1451 may manage a graphic effect that is provided to a user, or manage a user interface relevant thereto. The security manager 1452 may provide a general security function necessary for system security or user authentification. According to an embodiment, if an electronic device (e.g., the electronic device 101) includes a telephony function, the middleware 1430 may further includes a telephony manager for managing a voice or picture call function of the electronic device.

The middleware 1430 may include a middleware module to form a combination of diverse functions of the above-described elements. The middleware 1430 may provide a specialized module by a kind of OS in purpose of offering differentiated functions. Additionally, the middleware 1430 may remove a part of the preexisting elements, dynamically, or add a new element thereto.

The API 1460 may be, for example, a set of programming functions, and may be provided in a configuration which is variable depending on an OS. For example, in the case that an OS is the ANDROID or the iOS, it may be permissible to provide one API set per platform. In the case that an OS is the TIZEN, it may be permissible to two or more API sets per platform.

The application 1470 may include, for example, one or more applications capable of providing functions for a home 1471, a dialer 1472, an SMS/MMS 1473, an Instant Message (IM) 1474, a browser 1475, a camera 1476, an alarm 1477, a contact 1478, a voice dial 1479, an e-mail 1480, a calendar 1481, a media player 1482, am album 1483, and a timepiece 1484, or for offering health care (e.g., measuring an exercise quantity or blood sugar) or environmental information (e.g., atmospheric pressure, humidity, or temperature).

According to an embodiment, the application 1470 may include an application (hereinafter, referred to as "information exchanging application" for descriptive convenience) to support information exchange between the electronic device (e.g., the electronic device 101) and an external electronic device. The information exchanging application may include, for example, a notification relay application for transmitting specific information to the external electronic device, or a device management application for managing the external electronic device.

For example, the information exchanging application may include a function of transmitting notification information, which arise from other applications (e.g., the applications for SMS/MMS, e-mail, health care, or environmental information), to an external electronic device. Additionally, the information exchanging application, for example, may receive notification information from an external electronic device and may provide the notification information to a user.

The device management application may manage (e.g., install, delete, or update), for example, at least one function (e.g., turn-on/turn-off of an external electronic device itself (or a part of components) or adjustment of brightness (or resolution) of a display) of an external electronic device which communicates with the electronic device, an application operating in an external electronic device, or service (e.g., call service or message service) provided from an external electronic device.

According to an embodiment, the application 1470 may include an application (e.g., a health care application) which is assigned thereto in accordance with a property of the external electronic device. According to an embodiment, the application 1470 may include an application which is received from an external electronic device. According to an embodiment, the application 1470 may include a preloaded application or a third party application which is downloadable from a server. The titles of the program module 1410 according to the illustrated embodiment may be modifiable depending on kinds of OSs.

According to various embodiments, at least a part of the program module 1410 may be implemented in software, firmware, hardware, or at least two or more combinations among them. At least a part of the program module 1410, for example, may be implemented (e.g., executed) by a processor (e.g., the processor 1410). At least a part of the program module 1410 may include, for example, a module, a program, routine, a set of instructions, or a process for performing one or more functions.

Each of the above-described elements of the electronic device according to an embodiment of the present disclosure may be implemented using one or more components, and a name of a relevant component may vary with on the kind of the electronic device. The electronic device according to various embodiments of the present disclosure may include at least one of the above components. Also, a part of the components may be omitted, or additional other components may be further included. Also, some of the components of the electronic device according to the present disclosure may be combined to form one entity, thereby making it possible to perform the functions of the relevant components substantially the same as before the combination.

The term "module" used for the present disclosure, for example, may mean a unit including one of hardware, software, and firmware or a combination of two or more thereof. A "module", for example, may be interchangeably used with terminologies such as a unit, logic, a logical block, a component, a circuit, etc. The "module" may be a minimum unit of a component integrally configured or a part thereof. The "module" may be a minimum unit performing one or more functions or a portion thereof. The "module" may be implemented mechanically or electronically. For example, the "module" according to various embodiments of the present disclosure may include at least one of an Application-Specific Integrated Circuit (ASIC) chip performing certain operations, a Field-Programmable Gate Arrays (FPGAs), or a programmable logic device, those of which have been known or to be developed in the future.

At least a part of an apparatus (e.g., modules or functions thereof) or a method (e.g., operations) according to various embodiments of the present disclosure, for example, may be implemented by instructions stored in a computer-readable storage medium in the form of a programmable module. The instruction, when executed by a processor (e.g., the processor 120) may perform a function corresponding to the instruction. Such a computer-readable medium may be, for example, the memory 130.

The computer-readable recording medium may include a hard disk, a magnetic media such as a floppy disk and a magnetic tape, an optical media such as Compact Disc ROM (CD-ROM) and a Digital Versatile Disc (DVD), a magneto-optical media (e.g., floptical disk), and hardware devices (e.g., ROM, RAM, and flash memory). Also, a program instruction may include not only a mechanical code such as things generated by a compiler but also a high-level language code executable on a computer using an interpreter. The aforementioned hardware unit may be configured to operate via one or more software modules for performing an operation of the present disclosure, and vice versa.

According to various embodiments, a computer-readable recording medium may include a program collecting a first motion picture, extracting spatial information about at least a part of frames forming the first motion picture, and reflecting the extracted spatial information to generation of a 3D view corresponding to the first motion picture.

A module or a programming module according to various embodiments of the present disclosure may include at least one of the above elements, or a part of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added thereto.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image processing method performed in an electronic device, the image processing method comprising:
   obtaining a first motion picture by photographing an object;
   scaling down the first motion picture;
   cropping the scaled-down first motion picture, thereby resulting in a second motion picture;
   extracting spatial information using the second motion picture, wherein the second motion picture has a lower frame-rate than the first motion picture, while continuously obtaining the first motion picture, wherein the spatial information includes features of the object and depths of the features; and generating a 3-Dimensional (3D) view corresponding to the first motion picture based on the extracted spatial information.

2. The image processing method of claim 1, wherein the obtaining of the first motion picture comprises:

obtaining a first two-dimensional (2D) image corresponding to a first direction of the object, and a second 2D image corresponding to a second direction of the object.

3. The image processing method of claim 2, wherein the extracting of the spatial information comprises:

determining the spatial information based on at least a part of the first 2D image and the second 2D image.

4. The image processing method of claim 3, wherein the determining of the spatial information comprises:

determining a first feature of the first 2D image and a second feature of the second 2D image corresponding to the first feature; and based on at least a part of the first feature and the second feature, determining a location of the object as at least a part of the spatial information.

5. The image processing method of claim 2, wherein the 3D view generation comprises:

determining a third direction based on the first direction and the second direction; and generating a 3D image of the object based on the third direction.

6. The image processing method of claim 2, wherein the 3D view generation comprises:

correcting a plurality of images, which correspond to a plurality of directions, based on the spatial information; and providing the 3D view based on the correcting.

7. The image processing method of claim 6, wherein the correcting comprises:

generating a virtual ideal path of the electronic device; and correcting a location of at least one of a plurality of images based on the virtual ideal path and the spatial information.

8. The image processing method of claim 1, wherein the extracting of the spatial information comprises:

if an ideal path intersects an actual path along which the electronic device moves or the ideal path adjoins the actual path in a specific range, sampling the first motion picture.

9. The image processing method of claim 8, wherein the extracting of the spatial information comprises:

extracting a correction parameter for converting a non-sampled frame of the first motion picture into a frame photographed on the ideal path.

10. The image processing method of claim 8, wherein the extracting of the spatial information comprises:

scaling down non-sampled frames of the first motion picture based on a number of features included in each frame determined as the at least the part of the frames.

11. An electronic device with a camera module, the electronic device comprising:

the camera module configured to photograph an object; and a processor configured to generate a 3D view of the object, wherein the camera module begins to obtain a first motion picture by photographing the object, wherein the processor scales down the first motion picture, crops the scaled down first motion picture, thereby resulting in a second motion picture and generates a 3D view corresponding to the first motion picture based on spatial information about the second motion picture, wherein the second motion picture has a lower framerate than the first motion picture, while continuously obtaining the first motion picture, and wherein the spatial information includes features of the object and depths of the features.

12. The electronic device of claim 11, further comprising a sensor module, wherein the processor extracts the spatial information about the second motion picture based on information obtained through the sensor module.

13. The electronic device of claim 11, wherein the processor changes a photographing mode of the first motion picture based on the spatial information.

14. The electronic device of claim 13, wherein if a feature between continuous frames forming the second motion picture varies in a degree equal to or higher than a first value and a dispersion value of the feature varies in a degree equal to or higher than a second value, the processor allows the first motion picture to be obtained by a first mode.

15. The electronic device of claim 14, wherein in the first mode, the processor obtains the first motion picture by changing at least one of an operating speed, sensitivity, and an exposure time of an image sensor.

16. The electronic device of claim 13, wherein if a feature between continuous frames forming the second motion picture varies in a degree equal to or higher than a first value and a dispersion value of the feature varies in a degree lower than a second value, the processor allows the first motion picture to be //obtained by a second mode.

17. The electronic device of claim 16, wherein in the second mode, the processor obtains the first motion picture by using a plurality of sensors.

18. The electronic device of claim 13, wherein if relative similarity between frames included in the second motion picture is lower than a specific value, the processor obtains the first motion picture in a mode guiding a user to a photographing direction or a photographing speed.

* * * * *